(12) United States Patent
Eisenmann et al.

(10) Patent No.: US 10,417,833 B2
(45) Date of Patent: Sep. 17, 2019

(54) AUTOMATIC 3D CAMERA ALIGNMENT AND OBJECT ARRANGMENT TO MATCH A 2D BACKGROUND IMAGE

(71) Applicant: ADOBE INC., San Jose, CA (US)

(72) Inventors: Jonathan Eisenmann, San Francisco, CA (US); Geoffrey Alan Oxholm, Albany, CA (US); Elya Shechtman, Seattle, WA (US); Bryan Russell, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 5 days.

(21) Appl. No.: 15/804,908

(22) Filed: Nov. 6, 2017

(65) Prior Publication Data

US 2019/0139319 A1    May 9, 2019

(51) Int. Cl.
*G06T 19/20* (2011.01)
*G06T 15/20* (2011.01)

(52) U.S. Cl.
CPC ............. *G06T 19/20* (2013.01); *G06T 15/20* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| 9,008,460 | B2 | 4/2015 | Shechtman et al. | |
| 9,098,885 | B2 | 8/2015 | Shechtman et al. | |
| 9,519,954 | B2 | 12/2016 | Shechtman et al. | |
| 10,026,218 | B1* | 7/2018 | Mertens | H04N 13/332 |
| 2016/0250006 | A1* | 9/2016 | Fisker | A61C 9/0046 |
| | | | | 433/213 |

* cited by examiner

*Primary Examiner* — Michelle Chin
(74) *Attorney, Agent, or Firm* — Shook, Hardy & Bacon, L.L.P.

(57) ABSTRACT

Embodiments disclosed herein provide systems, methods, and computer storage media for automatically aligning a 3D camera with a 2D background image. An automated image analysis can be performed on the 2D background image, and a classifier can predict whether the automated image analysis is accurate within a selected confidence level. As such, a feature can be enabled that allows a user to automatically align the 3D camera with the 2D background image. For example, where the automated analysis detects a horizon and one or more vanishing points from the background image, the 3D camera can be automatically transformed to align with the detected horizon and to point at a detected horizon-located vanishing point. In some embodiments, 3D objects in a 3D scene can be pivoted and the 3D camera dollied forward or backwards to reduce changes to the framing of the 3D composition resulting from the 3D camera transformation.

20 Claims, 15 Drawing Sheets

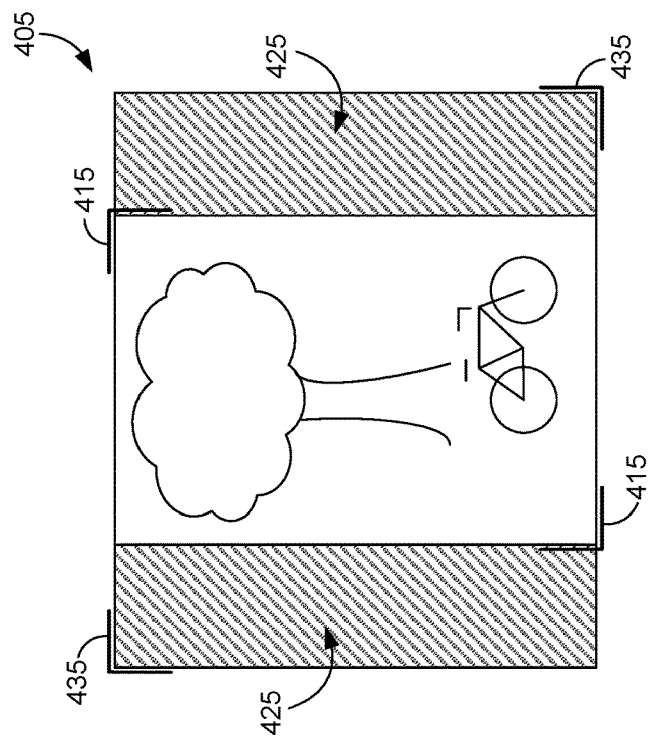
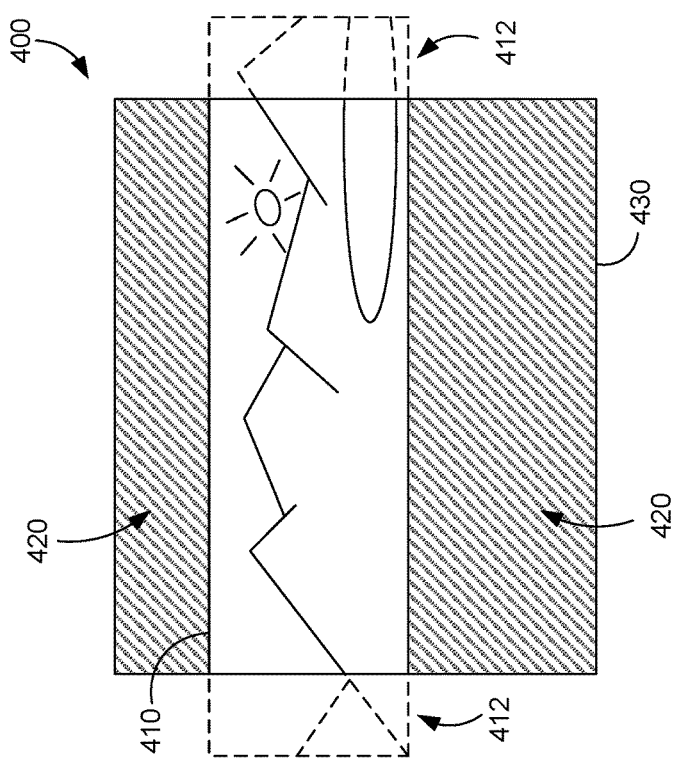
FIG. 4B.
FIG. 4A.

AUTOMATIC 3D CAMERA ALIGNMENT AND OBJECT ARRANGMENT TO MATCH A 2D BACKGROUND IMAGE

BACKGROUND 3D composition software allows graphic designers and other users to import and arrange 3D objects (e.g. 3D mesh objects) into a 3D scene. The 3D scene can be viewed using a 3D camera located in the 3D scene. Rays are cast from the camera to render a 2D representation of the 3D scene that can be provided to a user application to visualize 3D objects in the scene. In some software, the 3D camera can be arranged in various ways to view the scene from different camera perspectives. In this manner, the orientation of the 3D camera effects how the 3D scene appears on a 2D screen.

Some 3D composition software allows users to import a 2D image into the background of a 3D scene. Often users will desire to arrange the 3D objects in a scene in a way that aligns with the background image. For example, if a background image depicts a table, a user may want to arrange the 3D objects and/or the 3D camera so the 3D objects appear to be resting on the top of the table. Conventional creative software tools require users to manually rotate the 3D objects to estimate an appropriate alignment.

SUMMARY

Generally, a graphic designer or other user of a 3D composition program may desire to import a 2D background image into a 3D scene. Accordingly, embodiments are disclosed herein for automatically aligning a 3D camera with a 2D background image. Generally, an automated image analysis can be accessed or otherwise performed on the 2D background image to detect a horizon and one or more vanishing points from the background image. In some embodiments, a classifier can be trained to predict whether the automated image analysis is accurate within a defined confidence level. For example, a classifier can be trained to predict whether a pair of detected horizon-located vanishing points is accurate. If the automated image analysis is classified as accurate, an automatic 3D camera alignment feature can be enabled that permits a graphic designer to automatically align the 3D camera with the 2D image. For example, the 3D camera can be aligned to point at a detected horizon-located vanishing point.

As described herein, one or more classifiers can be trained to predict whether an automated image analysis is accurate. For example, a horizon confidence classifier can be trained to predict whether a detected horizon is accurate within a defined confidence level. Generally, one or more annotated image datasets can be generated for training. For example, an automated image analysis can be run on an image dataset to detect horizons, and a first set of annotations can be generated by drawing the detected horizons on corresponding images and asking test subjects whether the detected horizon appears accurate. A second set of annotations can be generated by asking test subjects to determine the locations of vanishing points. Classifier inputs can be defined using image features corresponding to statistics about the automated image analysis (e.g., statistics about detected vanishing points and detected line segments), and a classifier can be trained using the first and/or second set of annotations as ground truth. In various embodiments, an automatic 3D camera alignment feature that relies upon an automated image analysis can be disabled unless a classifier determines the automated image analysis is likely to be accurate.

Accordingly, an automatic 3D alignment can be performed to align the 3D camera with an analyzed 2D background image. For example, a target field of view, target orientation matrix and target yaw can be generated to align the 3D camera with a particular orientation. For example, in some embodiments, target parameters are generated for a 3D camera to point the camera at a detected horizon-located vanishing point and orient the camera such that changes in yaw point the camera along a detected horizon. In some embodiments, the scene geometry of the 3D scene can be adjusted to reduce changes to the framing of 3D objects in the 3D camera's viewport. For example, a delta yaw can be determined from the 3D camera's original and transformed positions, and 3D objects in the scene can be pivoted around a pivot point by delta yaw. Finally, the 3D camera can be dollied towards or away from the pivot point to compensate for a change in the 3D camera's field of view.

As such, techniques are disclosed herein for automatically determining whether an automated image analysis is accurate within a defined confidence level and for automatically aligning a 3D camera with a 2D background image.

BRIEF DESCRIPTION OF THE DRAWINGS

The present invention is described in detail below with reference to the attached drawing figures, wherein:

FIGS. 4A-4B illustrate exemplary 2D background images relative to a 3D camera viewport, in accordance with embodiments of the present invention;

DETAILED DESCRIPTION

Overview

Figure 1:
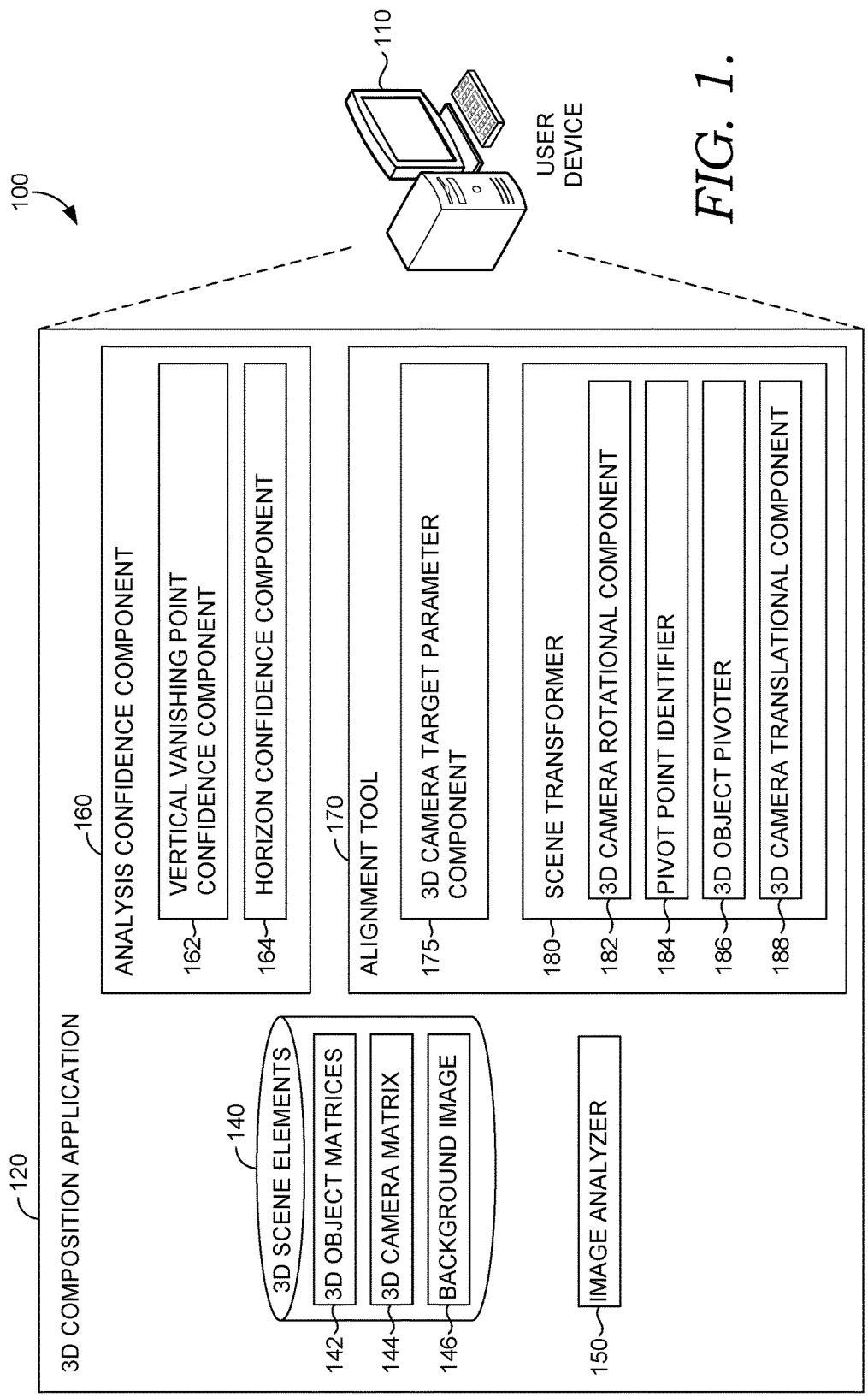
FIG. 1 is a block diagram of an exemplary computing system for aligning a 3D camera with a 2D image, in accordance with embodiments of the present invention.

Users of 3D composition software such as graphic designers may seek to combine 2D and 3D objects within a 3D scene. For example, users may wish to combine 3D objects (e.g., mesh representations of objects) with 2D background images. Many conventional creative software tools do not include this functionality, and those few that do require users to manually rearrange the 3D objects to align them with a background image. For example, imagine a 3D scene with two 3D meshes: an origami crane and a robot figurine. Assume each mesh is facing towards a 3D camera pointing at the 3D meshes. Now assume the user desires to import a 2D image as a background for the 3D scene, for example, a photo of a table taken from a perspective looking down at the table. In this situation, the 3D meshes (which are facing the 3D camera) will not be aligned with the surface of the table in the background image (e.g. the 3D meshes will not appear as if they were resting on the table). Generally, users will prefer that 3D objects and a 2D background image are aligned, however, conventional creative software tools require users to manually rotate the 3D objects to estimate an appropriate alignment. This manual rotation may be repeated for each 3D object. This process can be tedious, time consuming.

Another potential technique might be to rotate the 3D camera in order to alter the perspective from which the 3D objects are viewed. With a proper 3D camera alignment, the 3D objects can appear properly aligned with the background. In this manner, the 3D camera might be aligned with the 2D background image. However, such 3D camera alignment has presented a challenge for conventional creative software tools, for example, due to the complexities of performing rotations in 3D space. To the extent that conventional tools permit users to independently rotate a 3D camera to perform a manual alignment, again, such a process is tedious and time consuming, resulting in an unsatisfactory process.

Accordingly, embodiments of the present disclosure are directed to facilitating automatic alignment of a 3D camera with a 2D background image. In particular, an automated image analysis can be accessed or otherwise performed on a 2D background image to detect image features of the background image (e.g., locations of vanishing points, horizon, detected line segments, etc.) and/or camera parameters for the camera that took the image (e.g., field of view, resolution, etc.). A classifier can be trained and utilized to predict whether the automated image analysis is accurate within a selected confidence level. If the classifier predicts that an analysis is accurate within the selected confidence level, a software feature can be enabled that permits a user to automatically align the 3D camera with the analyzed background image.

The automatic alignment involves generating target parameters for a transformation of the 3D camera based on the automated image analysis results. More specifically, the background image can be superimposed on a 2D viewport frame of the 3D camera, and a target field of view for the 3D camera can be determined to match a visible portion of the background image in the viewport frame. A viewport horizon can be determined in the viewport frame that corresponds to a detected horizon of the background image, and a target orientation matrix for the 3D camera can be determined that would point the 3D camera at a desired location on the background image (e.g., a detected vanishing point). For example, an intermediate orientation can be determined that would align the 3D camera with a detected horizon, and a target yaw can be applied to generate a target orientation matrix that would point the 3D camera at a horizon-located vanishing point. Finally, a delta yaw can be determined that would result from rotating the 3D camera to the target yaw.

With these target parameters for 3D camera transformation, the 3D camera configuration and 3D scene geometry can be adjusted. For example, the 3D camera can be transformed by applying the target field of view and target orientation matrix, and setting a minimum height for the 3D camera. If this transformation does not result in a significant change in orientation (e.g., the 3D camera orientation changes without changing the horizon more than a defined threshold), the 3D camera transformation may be undone and the alignment process ended to avoid unnecessary scene manipulations. With respect to scene geometry, a pivot plane can be determined that intersects the center of a 3D bounding box normal to an original forward vector of the 3D camera, and a pivot point can be determined that intersects the pivot plane and the original forward vector of the 3D camera. 3D objects in the scene can be pivoted around the pivot point by delta yaw to reduce changes to the original framing of the composition (pre-camera transformation). Finally, the 3D camera can be dollied towards or away from the pivot point to match a dimension of the viewport bounding box (e.g., the horizontal width) before and after the change to the 3D camera field of view.

As such, using implementations described herein, a user can efficiently and effectively transform a 3D camera and/or 3D scene geometry to automatically align the 3D camera with a 2D background image and reduce changes to the framing of the scene geometry resulting from the camera transformation. Further, the system and method can analyze the 2D background image in advance and disable the alignment feature when accuracy cannot be predicted within a selected confidence level.

Having briefly described an overview of aspects of the present invention, various terms used throughout this description are provided. Although more details regarding various terms are provided throughout this description, general descriptions of some terms are included below to provider a clearer understanding of the ideas disclosed herein:

Image space and image frame—As used herein, a 2D background image can be represented in a 2D frame of reference called the image space. Image space can be defined on normalized intervals such as $0 \leq x \leq 1$; $0 \leq y \leq 1$, regardless of image aspect ratio. The boundary of the 2D background image in image space is generally referred to herein as the image frame.

Vanishing points—In perspective photography, line segments in an image tend to resolve towards vanishing points. Such lines are referred to as vanishing lines. For three dimensional images, vanishing points may occur in each of the three cardinal dimensions (e.g., x vanishing point, y vanishing point and z vanishing point). In many images, vanishing points can occur on a horizon. These vanishing points are generally referred to herein as horizon-located vanishing points. For example, a 2D image can be analyzed to identify vanishing points (e.g., in image space), such as a vertical vanishing point (e.g., y vanishing point) and two horizon-located vanishing points (x vanishing point and z vanishing point). Vanishing points need not be located on the image.

World space and 3D scene—As used herein, a 3D scene can be composed relative to a 3D frame of reference called the world space. Objects in the scene can be defined relative to an origin in the world space, and positions can be defined in terms of a world space coordinate system (e.g., Cartesian, cylindrical, spherical, etc.). The 3D scene can include a ground plane (e.g., in which y=0 in the world space). The 3D scene can include 3D objects (e.g., 3D meshes), the 3D camera and light sources that generate shadows on the ground plane and other objects.

3D objects—3D objects are virtual images represented in three dimensions. 3D objects can have object properties such as position (e.g., Cartesian coordinates), orientation (e.g., represented as Euler angles, a transformation or rotational matrix relative to the world space, etc.) and scale (e.g., magnification in each Cartesian dimension), to name a few.

3D bounding box—A 3D bounding box is a rectangular prism that bounds all the 3D objects within a scene. This does not include the 3D camera. For embodiments in which the 3D bounding box is axis-aligned to the world space, the minimum and maximum values of 3D object locations in each direction can be determined, and a box can be generated that bounds the minimum and maximum values.

3D Camera—A virtual 3D camera can be defined through which 3D objects in the 3D scene can be viewed. A 3D camera generally has lens properties such as resolution and field of view. A 3D camera's field of view has horizontal and vertical components corresponding to the vertical and horizontal angles that the 3D camera can view. The 3D camera can be arranged with a position and an orientation in the world space relative to other 3D objects in the scene. In this manner, the 3D camera provides a reference point in the world space from which rays are cast into the scene to visualize 3D objects in the scene.

Viewport, viewport space and viewport frame—Viewport space generally refers to a 2D slice of the 3D camera's field of view. In this sense, viewport space is a 2D representation of the perspective from the 3D camera and can be provided to a user application to allow a user to visualize the 3D scene. The boundary of viewport space that is visible in a user application is generally referred to as the viewport frame or, more generally, the viewport.

Viewport bounding box—Generally, a viewport bounding box is a rectangle that bounds the 3D objects in a scene rendered in viewport space.

Exemplary Automated Alignment Environment

Referring now to FIG. 1, a block diagram of exemplary environment 100 suitable for use in implementing embodiments of the invention is shown. Generally, environment 100 is suitable for 3D composition and/or graphic design, and, among other things, facilitates automatic alignment of a 3D camera with a 2D background image. Environment 100 includes user device 110, which can be any kind of computing device capable of facilitating 3D composition and/or graphic design. For example, in an embodiment, user device 110 can be a computing device such as computing device 1500, as described below with reference to FIG. 15. In embodiments, user device 110 can be a personal computer (PC), a laptop computer, a workstation, a mobile computing device, a PDA, a cell phone, or the like.

As illustrated, user device 110 includes 3D composition application 120, which itself includes 3D scene elements database 140, image analyzer 150, analysis confidence component 160 and alignment tool 170. Generally, 3D composition application 120 can be any application capable of facilitating 3D composition and/or graphic design. As can be appreciated, in some embodiments, in addition to facilitating 3D composition and/or graphic design, 3D composition application 120 may facilitate the automatic determination of whether an automated image analysis is accurate within a defined confidence level and/or the automatic alignment of a 3D camera with a 2D background image. For example, analysis confidence component 160 and/or alignment tool 170 may be incorporated, or integrated, into an application or an add-on or plug-in to an application, such as 3D composition application 120. 3D composition application 120 may be a stand-alone application, a mobile application, a web application, or the like. In some implementations, the application(s) comprises a web application, which can run in a web browser, and could be hosted at least partially server-side. In addition, or instead, the application(s) can comprise a dedicated application. In some cases, the application can be integrated into the operating system (e.g., as a service). Although analysis confidence component 160 and alignment tool 170 are generally discussed herein as being associated with an application, in some cases, analysis confidence component 160 and/or alignment tool 170, or portions thereof, can be additionally or alternatively integrated into the operating system (e.g., as a service) or a server (e.g., a remote server).

In the embodiment illustrated in FIG. 1, 3D composition application 120 generally provides a software environment for a user to compose 3D scenes using user device 110. More specifically, 3D composition application 120 provides a 3D scene defined in terms of a world space, in which 3D objects can be imported and arranged. The 3D scene includes a 3D camera, through which 3D objects in the scene can be visualized. The 3D scene can also include a 2D background image, e.g., imported by a user. As described in more detail below, alignment tool 170 automatically aligns the 3D camera with a 2D background image.

A database, such as 3D scene elements database 140, can store representations of 3D objects, the 3D camera and a background image. For example, 3D objects can be represented as 3D object matrices 142, and the 3D camera can be represented as 3D camera matrix 144 to describe position and orientation in the world space. By way of nonlimiting example, 3D objects and/or the 3D camera can be represented as a 4×4 matrix to capture orientation (e.g., the first three columns can include three orthogonal vectors representing the orientation of a 3D object/camera) and position (e.g., the fourth column can include three position coordinates and the number 1) in world space. With respect to a background image, 3D scene elements database 140 may store background image 146 as a representation in image space and/or viewport space, and may include related information such as the image analysis output results from image analyzer 150.

Image analyzer 150 performs an automated image analysis of a 2D background image to estimate image features of the background image (e.g., locations of vanishing points, horizon, etc.) and/or camera parameters for the camera that took the image (e.g., field of view, resolution, etc.). Various techniques for performing an automated image analysis can be implemented, as would be understood by a person of ordinary skill in the art, such as those described in Applicant's U.S. Pat. Nos. 9,098,885; 9,519,954; 9,729,787; 9,008,460; and 9,582,855, the contents of which are herein incorporated by reference.

Generally, an automated image analysis can be performed to estimate the location of vanishing points using line segments detected in an image. In conventional techniques, these line segments are generated based on sharp changes in contrast in an image. For example, doors, windows, tilework and anything else that produces a "line" can contribute to the determination of vanishing point locations for an image. In a well-behaved image, every line segment is a vanishing line aligned with the principal axes of the environment. This rarely happens, however. Instead, many things can give rise to line segments that are not oriented towards vanishing points for the image such as clutter (e.g., small objects), art (e.g., depicting other scenes), natural surfaces (e.g., grass is made of line segments), reflections, furniture placed askew, shadows, etc. A line segment analysis may not be able to discern which detected line segments come from which sources, so conventional analyses attempt to identify vanishing points for the image by clustering detected line segments into groups that appear to have the same vanishing point, and then estimating the camera that would allow for those segment clusters to represent three (or more) directions in a real space. In this manner, the automated image analysis can estimate locations of vanishing points, camera parameters that would make sense for such a configuration of vanishing points, and a corresponding horizon.

Estimates from the automated image analysis can be used for various purposes. For example, an estimated vanishing point can be used to align a 3D camera, as explained in more detail herein. However, the quality of estimates from an automated image analysis can depend on the image that was analyzed, and some estimates may lack a desired accuracy for a given application. Moreover, some images may not have vanishing points to detect, while an automated image analysis may nevertheless provide estimated vanishing point locations. Accordingly, techniques are needed for quantifying the accuracy of automated image analysis estimates.

Accordingly, techniques are disclosed herein for evaluating the accuracy of an automated image analysis within a selected confidence level (e.g., via analysis confidence component 160). Various techniques for evaluating accuracy may be implemented. For example, embodiments can be implemented to identify data patterns from the image analysis to predict accuracy of an estimate from the image analysis as a success or a failure (e.g., whether an estimated horizon is accurate within a selected confidence level or not). In embodiments where the automated image analysis relies on detected line segments, statistics about detected line segments may be used as inputs into one or more classifiers to predict a success or a failure of an estimate. More specifically, one or more classifiers (e.g., linear classifiers) can be trained using detected image features as inputs and using annotated image datasets as ground truth. A particular classifier can be characterized by its precision and recall, and various combinations of precision and recall result in a corresponding confidence. In this manner, a desired confidence level (i.e., a probability of successfully predicting accuracy) can be selected to produce a desired precision and recall. Accordingly, a confidence level can be selected to set a desired probability that a classifier will correctly predict that an automated image analysis and/or one or more of its estimates is accurate. In various embodiments, only an automated image analysis that a classifier determines to be accurate is utilized for subsequent processing.

For example, one or more classifiers can be trained to predict the accuracy of detected vanishing points and/or detected horizons for a particular automated image analyzer (e.g., image analyzer 150). More specifically, outputs of the automated image analysis can be utilized to derive image features for classifier inputs. In embodiments where the automated image analysis utilizes detected line segments from an analyzed image to estimate a horizon and/or one or more vanishing points for the image, various image features relating to the detected line segments can be defined and utilized as classifier inputs. For example, detected image features for an analyzed image can be defined based on statistics about detected line segments (e.g., total number of detected segments in an image, segment density in the image, etc.). These features can explain roughly how well behaved the analyzed image is as a whole. Additionally and/or alternatively, detected image features can be defined based on statistics about detected line segments relative to a detected vanishing point (e.g., number of segments found to be vanishing lines, i.e., well-explained by at least one vanishing point, etc.). These features can help describe how well a vanishing point is explained by an image analysis.

In some embodiments, histograms can be generated and quantile values utilized as classifier inputs. For example, a histogram of distances of vanishing lines to corresponding vanishing points can be generated with a defined number of quantiles (e.g., the 0% quantile is the closest vanishing line's distance, the 100% quantile is the furthest away, etc.). Additionally and/or alternatively, a histogram of lengths of vanishing lines associated with a corresponding vanishing point can be generated (e.g., the 0% quantile is the shortest vanishing line, the 100% quantile is the longest, etc.). The defined number of quantiles in a histogram can be used to characterize the corresponding distribution.

In this manner, various image features can be defined based on detected line segments of the automated image analysis, including count-based features, length-based features, distance-based features, segment location features, combinations thereof, and the like. Table 1 illustrates an exemplary set of image features that can be utilized as classifier inputs. In Table 1, image features corresponding to statistics about detected line segments appear in plain text, and image features corresponding to statistics about detected line segments relative to a detected vanishing point are italicized. Although values of features identified in Table 1 may be defined in terms of image pixels, features may be represented in absolute terms, image space, viewport space, some combination thereof, or otherwise. Moreover, some entries in Table 1 can correspond to more than one image feature (e.g., the histograms can generate any number of image features). Accordingly, in one exemplary implementation of Table 1, outputs of the automated image analysis can be utilized to derive 66 image features for classifier inputs (e.g., a vertical vanishing point confidence classifier). Various combinations of these, and other image features, may be implemented and are contemplated within the present disclosure.

TABLE 1

| Count-based features | |
|---|---|
| A. | How many segments were detected |
| B. | Segment density (A ÷ pixels in the image) |
| C. | Segments found to be vanishing lines |
| D. | Vanishing line density (C ÷ pixels in the image) |
| E. | Percent of vanishing lines (C ÷ A) |
| Length-based features | |
| F. | Total length (in pixels) of all segments |
| G. | Pixel length of "vanishing lines" |
| H. | Shortest segment |

TABLE 1-continued

I. Mean segment length (F ÷ A)
J. Longest segment length
Distance-based features K. Average vanishing line distance to vanishing point
L. Standard deviation of vanishing line distance to vanishing point
M. Histogram of distances
N. Histogram of lengths
Segment location features O. The average position of segments
P. The horizontal variance of segment position
Q. The vertical variance of segment position
R. The bounding box
   (e.g., top left and bottom right positions of the range of segment centers)
S. O-R but for only vanishing lines
   (lines found to be close to a corresponding vanishing point)
T. The distance from the center of vanishing segments to the center of all segments To train a classifier, one or more annotated image datasets can be generated or otherwise accessed. For example, an image dataset can be annotated with vanishing point locations (e.g., manually identified), and a classifier can be trained using the annotated vanishing point locations as ground truth. Additionally and/or alternatively, an image dataset (whether the same dataset as above or separate) can be analyzed using the automated image analysis to detect horizons for images in the dataset. Detected horizons can be drawn on corresponding images, and the quality of the detected horizon can be evaluated. For example, test subjects can evaluate whether and/or to what extent a detected horizon appears to be accurate. The evaluation can be binary (e.g., accurate/inaccurate), quantified (e.g., measured on a scale of 1-10), or otherwise. These evaluations can be included in the image dataset as qualitative annotations, and a classifier can be trained using the annotated horizon quality as ground truth. Additionally and/or alternatively, a classifier can be trained using some combination of annotated horizon quality and vanishing point locations as ground truth. Other variations can be implemented and are contemplated within the present disclosure.

Various classifier implementations are possible, as would be understood by a person of ordinary skill in the art. In a preferred embodiment, a linear support vector machine can perform the classification. In this manner, a classifier can be trained to evaluate the accuracy of a single detected vanishing point (e.g. a vertical vanishing point, a horizon-located vanishing point, etc.) and/or combinations of detected vanishing points (e.g., a pair of horizon-located vanishing points).

In a first example classifier, a vertical vanishing point confidence classifier (e.g., vertical vanishing point confidence component 162) can be trained to predict the accuracy of an estimated vertical vanishing point from an automated image analysis. The classifier can be trained using defined image features as inputs and using the annotations of vertical vanishing point locations as ground truth. For example, a detected vanishing point can be classified as accurate, for example, if the detected vanishing point falls within a defined threshold distance of an annotated vertical vanishing point location (e.g., a defined number of pixels, a defined percentage of image width, etc.), if an angle between a first vector from a reference point to the detected vanishing point and a second a vector from the reference point to the ground truth vanishing point falls within a defined angular threshold (e.g., 1°, 5°, etc.), some combination thereof, or otherwise. Thus, some embodiments may implement a piecewise success function.

For example, if a ground truth vanishing point location is located on or within a defined distance of an edge of the analyzed image (e.g., outside the image but within 50% of the image width away), success can be defined based on a defined threshold distance (e.g., a detected vanishing point is classified as accurate if it falls within 2% of the image width away from ground truth). If a ground truth vanishing point location is located beyond the defined distance of an edge of the analyzed image (e.g., beyond 50% of the image width away), the success function can be based on a defined angular threshold. For example, one or more reference points can be defined (e.g., any or all of the four corners of the analyzed image, approximations thereof that fall within an image boundary, etc.), two vectors can be generated originating from each reference point and terminating at the detected vanishing point and the ground truth vanishing point, respectively, and the angle between two vectors can be compared against the defined angular threshold (e.g., 5°). Generally, when the ground truth vanishing point is close to the edge of the analyzed image (e.g., within 50% of the image width away), reference points corresponding to the closest corners of the detected image can produce relatively large angles that can result in false negatives. Accordingly in some embodiments, four reference points can be defined as approximations of the four corners of the analyzed image, all four corresponding angles can be determined and compared against the defined angular threshold, and success can be defined when any of the corresponding angles falls within the defined angular threshold. In other embodiments, instead of determining all four corresponding angles, only the angle corresponding to the reference point determined to be farthest from the ground truth vanishing point is determined and compared against the defined angular threshold. Other variations are possible and can be implemented within the present disclosure.

In a second example classifier, a horizon-located vanishing point confidence classifier can be trained to predict the accuracy of an estimated horizon-located vanishing point from an automated image analysis. In this example, the classifier can be designed to accept into the same classifier inputs image features detected for a first horizon-located vanishing point (e.g., x vanishing point) and image features detected for a second horizon-located vanishing point (e.g., z vanishing point). For example, assume a set of defined image features for each vanishing point are used for the classifier inputs (e.g., the 66 image features described above with respect to the exemplary implementation of Table 1). A detected x vanishing point can produce the defined number of image features (e.g., 66). Likewise, a detected z vanishing point can produce the defined number of image features (e.g., 66). In this example, the detected image features (whether for x or z vanishing points) are input into the same (e.g., 66) classifier inputs, whether in training or in operation. In this manner, the classifier can be trained using defined image features as inputs and using annotations of horizon-located vanishing point locations as ground truth, as described in more detail above.

In a third example classifier, a horizon confidence classifier (e.g., horizon confidence component 164) can be trained to predict the accuracy of an estimated pair of horizon-located vanishing points from an automated image analysis. In this example, the classifier can be designed to accept as separate classifier inputs image features detected for a first horizon-located vanishing point (e.g., x vanishing point) and image features detected for a second horizon-located vanishing point (e.g., z vanishing point). For example, assume a set of defined image features for a given vanishing point are used for the classifier inputs (e.g., the 66 image features described above with respect to the exemplary implementation of Table 1). Each detected vanishing point can produce the defined number of image features (e.g., 66). In this example, these detected image features are input into separate classifier inputs (e.g., 132 inputs), whether in training or in operation. In this manner, the classifier can be trained using defined image features as inputs and using annotations of horizon-located vanishing point locations and/or annotations of horizon quality as ground truth, as described in more detail above.

More specifically, success can be defined based on a combination of a comparison to a ground truth location of a horizon-located vanishing point and a ground truth horizon quality evaluation (e.g., whether a detected horizon appears accurate). For example, success can be defined when either a comparison of a detected vanishing point to a ground truth vanishing point falls within a defined threshold (e.g., distance, angular, piecewise, etc.) or a qualitative annotation evaluating a detected horizon indicates accuracy (e.g., binary selection, threshold applied to quantified scale, etc.). Defining success this way can avoid penalizing an automated analysis where a detected vanishing point is mathematically correct, but a detected horizon was evaluated as appearing inaccurate (e.g., human error).

Figure 2:
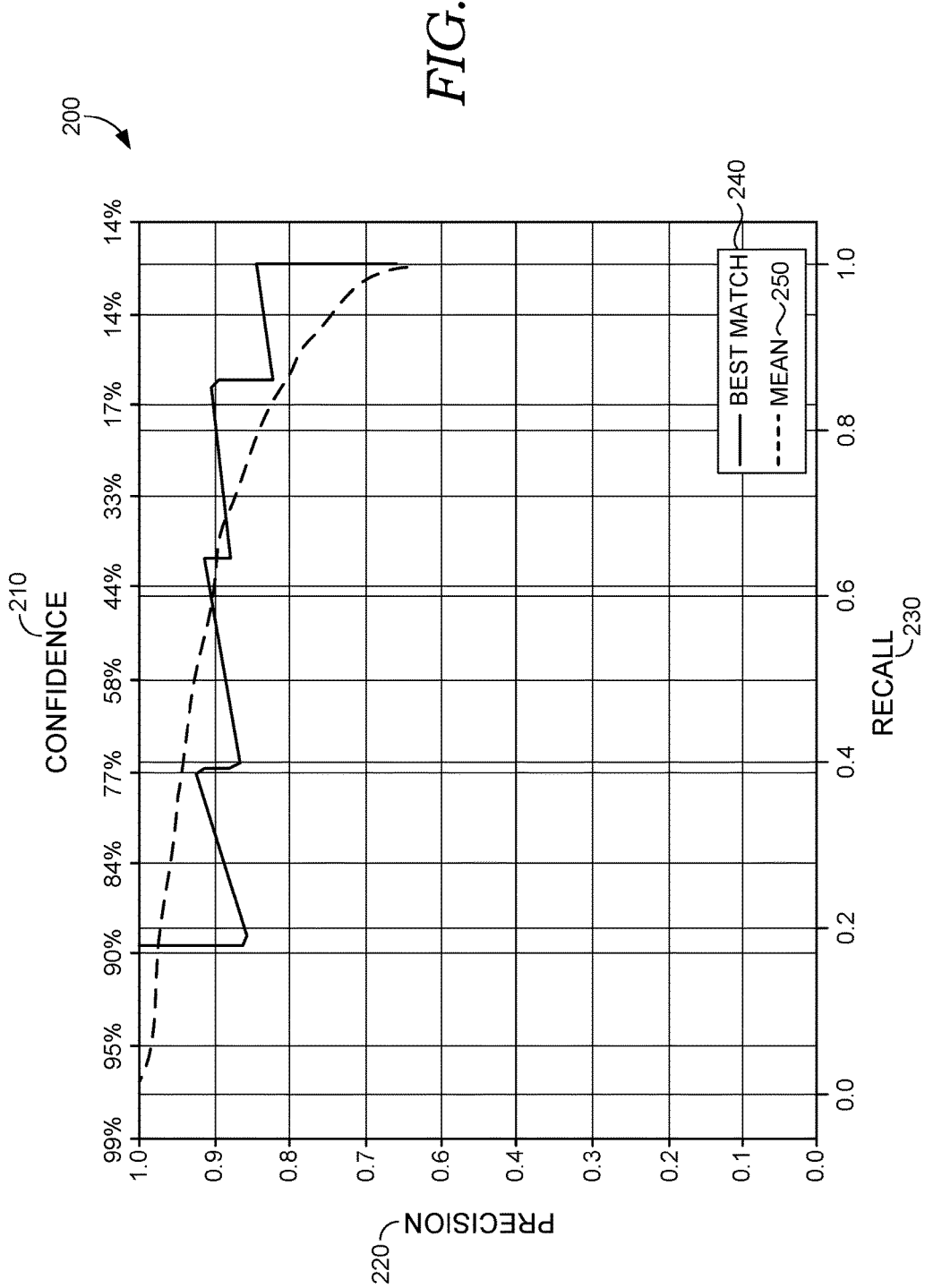
FIG. 2 illustrates the behavior of an exemplary classifier, in accordance with embodiments of the present invention.

In any of these examples, a trained classifier will display a characteristic behavior with respect to precision and recall. An annotated image dataset can be partitioned into training and testing sets, and the testing sets used to characterize the classifier's behavior. Moreover, an annotated image dataset can be partitioned into bins that can each be used to train and test separate classifier models. FIG. 2 depicts the behavior of an exemplary classifier. In FIG. 2, classifier behavior 200 illustrates an exemplary relationship between precision 220, recall 230 and confidence 210. Where a classifier is tested over multiple models, the performance of the best performing models can be concatenated to generate a best match curve such as best match curve 240, and the expected classifier behavior can be represented as the mean performance of the models such as mean curve 250. Combinations of precision and recall result in a corresponding confidence 210, as will be understood by a person of ordinary skill in the art. In this manner, a desired confidence level (i.e., a probability of successfully predicting accuracy) can be selected to produce a desired precision and recall (e.g., the operation point of mean curve 250).

For example and with respect to the classifier characterized by the graph of FIG. 2, a confidence level can be chosen to select a desired operation point (e.g., 82% precision, 80% recall). In this manner, the confidence level selected for a classifier can be used as a measure of the likelihood that the classifier will correctly predict that an automated image analysis and/or one or more of its estimates is accurate. If the classifier identifies an analysis and/or estimate as accurate within a selected confidence level, the analysis and/or estimate can be used for subsequent processing, for example, by alignment tool 170 of FIG. 1. On the other hand, if the classifier is unable to verify accuracy within the selected confidence level, subsequent use of the analysis and/or estimate can be disabled, enabled with a warning or other notification, or otherwise.

Returning now to exemplary environment 100 and 3D composition application 120 of FIG. 1, image analyzer 150 performs an automated image analysis on a selected 2D background image, and alignment tool 170 automatically aligns the 3D camera to the 2D background image using the results of the automated image analysis when analysis component 160 predicts that the automated image analysis was accurate. More specifically, analysis confidence component 160 can predict the accuracy of the automated image analysis within a selected confidence level (e.g., horizon confidence component 164 can use a linear classifier to predict whether a detected pair of horizon-located vanishing points is accurate, as described above). If analysis confidence component 160 predicts that the automated image analysis is accurate, a software feature of 3D composition application 120 can be enabled that permits a user to automatically align a 3D camera with the analyzed background image. On the other hand, if analysis confidence component 160 is unable to validate the accuracy of the automated image analysis within the selected confidence level, the software feature can be disabled. By way of nonlimiting example, a feature (e.g., a UI button) allowing a user to automatically align a 3D camera with 2D a background image (e.g., using alignment tool 170) can be enabled or disabled based on the prediction of the analysis confidence component 160. More generally, enabling an automatic 3D camera alignment that relies upon an image analysis only when analysis confidence component 160 predicts that the image analysis was accurate reduces the risk of applying an undesired camera rotation and improves the user experience.

In the embodiment illustrated in FIG. 1, alignment tool 170 includes 3D camera target parameter component 175 and scene transformer 180. Generally, 3D camera target parameter component 175 generates target parameters for a transformation of the 3D camera based on the automated image analysis results, and scene transformer 180 adjusts the 3D camera configuration and 3D scene geometry. These concepts are described in more detail below with respect to FIGS. 3-9.

Generally, 3D camera target parameter component 175 generates target parameters for the 3D camera, such as a target field of view, a target orientation matrix and/or a delta yaw. 3D camera target parameter component 175 generates target parameters using a horizon and/or one or more vanishing points corresponding to the 2D background image (e.g., a horizon and/or one or more vanishing points detected by the automated image analysis and accessed by target parameter component 175). For example, in embodiments where the automated image analysis identifies a vanishing point for a 2D background image, 3D camera target parameter component 175 can determine target parameters for a 3D camera to point the 3D camera at the vanishing point (e.g., a horizon-located vanishing point) of the 2D background image.

Figure 3:
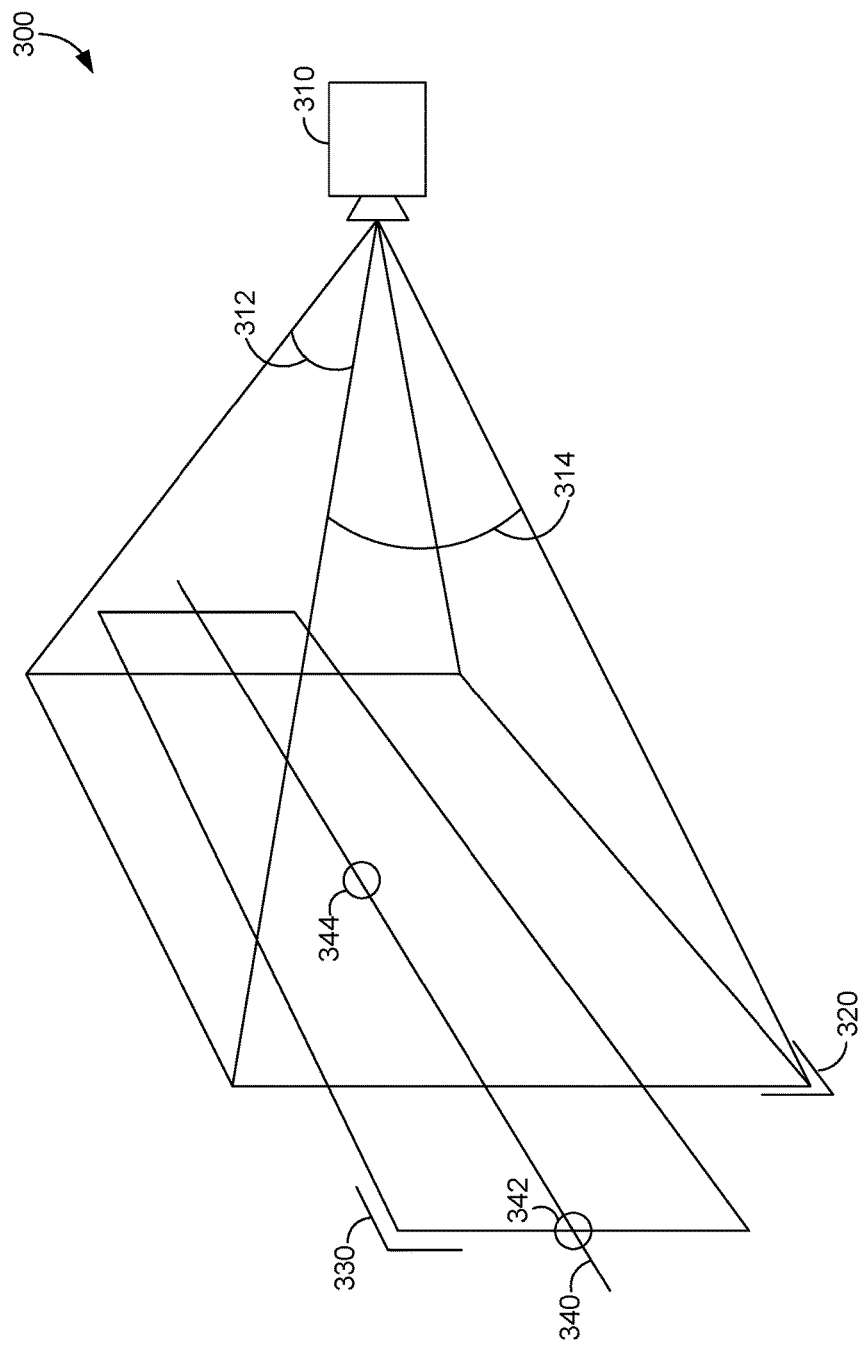
FIG. 3 illustrates an exemplary 2D background image relative to a 3D camera viewport, in accordance with embodiments of the present invention.

To generate 3D camera target parameters, a 2D background image is superimposed on a viewport frame of the 3D camera. FIG. 3 includes environment 300 illustrating an exemplary background image relative to a 3D camera viewport. 3D camera 310 is arranged and oriented in a 3D scene and views the 3D scene with horizontal field of view 312 and vertical field of view 314. Viewport frame 320 is a 2D slice of the perspective of 3D camera 310. Viewport frame 320 can be displayed on a user device to present a visualization of the 3D scene. An example 2D background image may correspond to image frame 330. The 2D background image in image frame 330, or a portion thereof, may be mapped to viewport frame 320 and converted to viewport space to generate a representation of the 2D background image in the viewport. In this manner, a 2D background image residing in image frame 330 can be superimposed on viewport frame 320, and a 2D representation of the 3D scene can be rendered, for example, in front of the 2D background image.

Generally, a 2D background image may not fit perfectly within the viewport (e.g., due to a mismatch in aspect ratios), so only a portion of the background image can be mapped to the viewport frame. For example, the entire image may not be visible in the viewport, or there may be more viewport area than there is image to fill it. Accordingly, the image may be occluded and/or letterboxing may occur. FIGS. 4A and 4B illustrate exemplary background images relative to a 3D camera viewport. In example 400 of FIG. 4A, image 410 has a different aspect ratio than viewport 430, resulting in image occlusions 412 and letterboxing 420. In example 405 of FIG. 4B, image 415 likewise does not fit perfectly within viewport 435, resulting in letterboxing 425.

With this in mind, 3D camera target parameter component 175 determines a target field of view for the 3D camera (e.g., target horizontal field of view) that matches a visible portion of the background image in the viewport frame (e.g., in the horizontal direction). For example, if the 3D camera cannot view the entire background image because the 3D camera has a portrait aspect ratio and the background image has a landscape aspect ratio, a portion of the image may be occluded. A target field of view for the 3D camera that corresponds to the un-occluded portion of the image in the viewport frame will effectively reduce the field of view from that of the camera that took the background image.

To determine a target orientation of the 3D camera, 3D camera target parameter component 175 accesses a detected horizon of the background image and converts the horizon into a viewport horizon in viewport space. In some embodiments, the detected horizon of the background image (e.g., horizon 340 in FIG. 3) is represented, for example, as one or more vertical values in image space. For example, horizon 340 may be represented as a y value of the intersection of the horizon with an edge of the image (e.g., horizon left point 342) and a y value of the horizon at the center of the image (e.g., horizon center point 344). These horizon points in image space are converted into viewport space using a desired image-to-viewport scale factor and accounting for any occlusions and/or letterboxing to determine the locations of corresponding horizon points in viewport space. For example, if I2VscaleFactor is a 2D image-to-viewport scale factor, HCi is a point in image space and HCv is a point in viewport space, then:

$HCv.x=HCi.x*I2VscaleFactor.x$ $HCv.y=HCi.y*I2VscaleFactor.y$

In this manner, pixel indices for each point in viewport space can be determined by multiplying the point in viewport space by the number of pixels in each direction (specified by the viewport resolution).

3D camera target parameter component 175 can generate a target orientation matrix for the 3D camera using the viewport horizon (e.g., center point and/or one or more edge points of the viewport horizon) and a vanishing point of the background image (e.g., a detected z vanishing point in viewport space). For example, an intermediate orientation can be determined that would rotate the 3D camera pitch to point the camera at the viewport horizon and orient the camera roll such that subsequent changes in yaw point the camera along the detected horizon (e.g., orient the 3D camera's forward vector toward the viewport horizon center point and orient the 3D camera's up vector perpendicular to the detected horizon). A target yaw can then be determined that would point the camera at the detected vanishing point, and a resulting target orientation matrix (e.g., rotational matrix, transformation matrix, etc.) constructed based on the target orientation. Other variations of target orientation (e.g., pointing the camera at or near a detected horizon, or other points on the background image) algebraic methodologies (e.g., determining target Euler angles and/or target orientation vectors in a different order) are possible and are contemplated within the present disclosure.

For example, rays can be cast from the 3D camera into the scene to generate target orientation vectors. In some embodiments, rays can be cast from the 3D camera to generate the following vectors characterizing an intermediate target orientation: (i) a forward vector corresponding to a ray cast from the 3D camera through the viewport horizon center point (i.e., a horizon center ray), (ii) an up vector corresponding to the forward vector crossed with a vector corresponding to a ray cast from the 3D camera through the viewport horizon left point (i.e., a horizon left ray), and (iii) a right vector corresponding to the up vector crossed with the forward vector. In some embodiments, if the up vector has a negative component (e.g., due to a negative determinant), its sign is reversed. As such, an intermediate target orientation matrix can be generated using these vectors. By way of nonlimiting example, a 3×3 rotational matrix and/or a 4×4 transformation matrix can be constructed using these vectors (e.g., the first column corresponds to the right vector, the second column corresponds to the up vector and the third column corresponds to the forward vector). In the case of a 4×4 matrix, the fourth column can be populated with the existing camera position. Of course, these particular vectors and matrices are merely exemplary, and any number of variations can be implemented by a person of ordinary skill in the art, and are contemplated within the present disclosure.

3D camera target parameter component 175 can generate a target yaw for the 3D camera using the intermediate target orientation of the 3D camera and a vanishing point of the background image. More specifically, a ray can be cast from the 3D camera to a detected horizon-located vanishing point (e.g., a detected z vanishing point) to define a vanishing point ray. In some embodiments, the ray is projected onto the ground plane of the 3D scene (e.g., y=0). In this manner, a target yaw can be determined based on a horizon center ray (e.g., the forward vector) and a (projected) forward vanishing point ray. For example, if ZVPg is a projected forward vanishing point ray (including z and x components), a TargetYawAngle for the 3D camera can be determined as:

TargetYawAngle=$a$ tan 2(Forward.z,Forward.x)–$a$ tan 2(ZVPg.z,ZVPg.x)

Accordingly, a target orientation matrix for the 3D camera (e.g., rotational matrix, transformation matrix, etc.) can be constructed, for example, by rotating the intermediate target orientation to the target yaw.

In some embodiments, in addition to a 3D camera transformation, the 3D objects in the scene are manipulated to reduce changes to the framing of a pre-camera-transformation scene composition. For example, and as explained in more detail below, 3D objects in the scene can be pivoted around a selected point in world space by an amount that depends on an expected rotation of the 3D camera. In this manner, a 3D object transformation can be anticipated based on an expected rotation of the 3D camera. For example, alignment tool 170 (e.g., via 3D camera target parameter component 175) can determine a delta yaw for 3D objects based on the target yaw and an original (pre-transformation)

yaw of the 3D camera. For example, where originalYawAngle is the yaw of the 3D camera before transformation, then DeltaYaw can be determined as:

DeltaYaw=TargetYawAngle−originalYawAngle

Accordingly, in these embodiments, 3D camera target parameter component 175 generates target parameters in preparation for a 3D scene transformation (e.g., via scene transformer 180). Preferably, the target orientation matrix for the 3D camera, the target field of view for the 3D camera and the pre-camera-transformation horizon (e.g., in image space and/or viewport space) are stored (e.g., in 3D scene elements database 140) so alignment tool 170 can refer back, if necessary.

Turning again to FIG. 1, scene transformer 180 adjusts the camera configuration and/or 3D scene geometry, preferably reducing changes to the framing of a pre-camera-transformation scene composition. In the embodiment depicted in FIG. 1, scene transformer 180 includes 3D camera rotational component 182, pivot point identifier 184, 3D object pivoter 186 and 3D camera translational component 188. In this embodiment, 3D camera rotational component 182 transforms the 3D camera by applying the target field of view, rotating the 3D camera to align the orientation with the target orientation matrix, and setting a minimum height for the 3D camera. If this transformation produces a minimal effect (e.g., the viewport horizon does not change more than a defined threshold), 3D camera rotational component 182 may undo the 3D camera transformation to avoid an unnecessary and potentially counter-productive scene manipulation.

Figure 5:
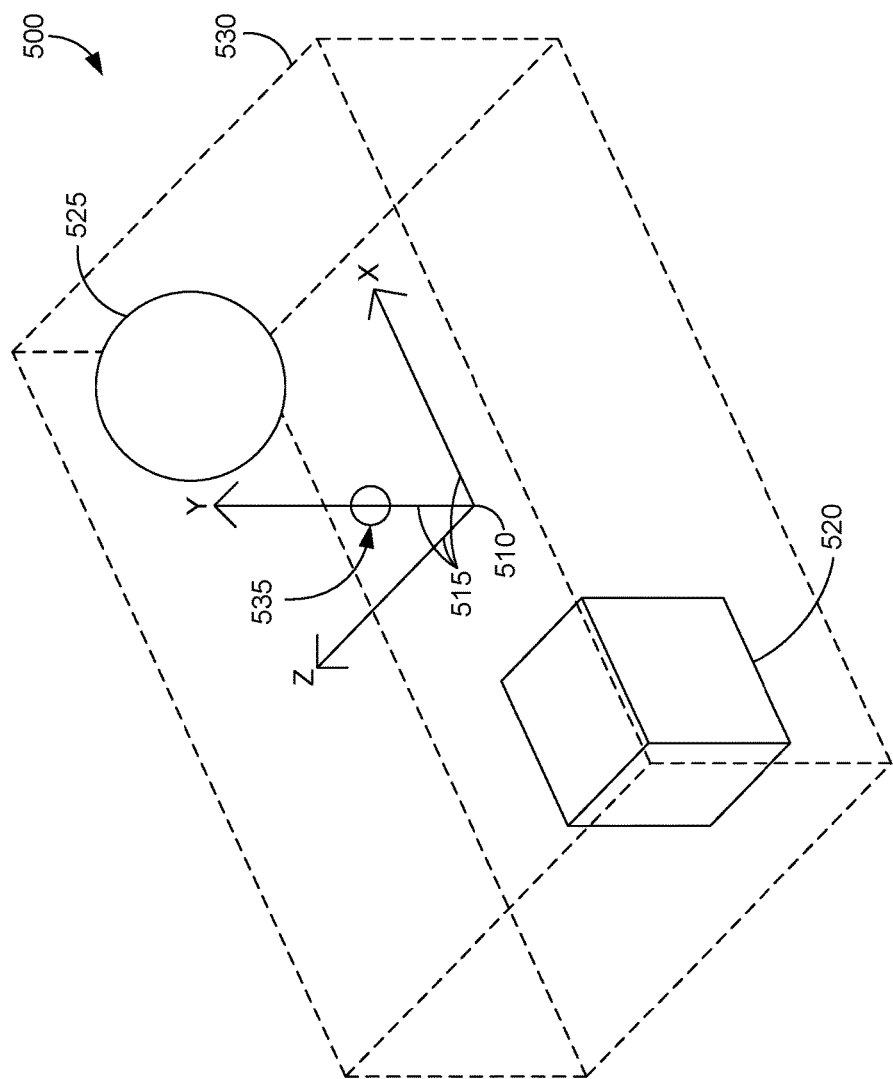
FIG. 5 illustrates an exemplary 3D bounding box, in accordance with embodiments of the present invention.

More specifically, 3D camera rotational component 182 can determine a minimum camera height for the 3D camera. Preferably, the minimum camera height is set to the height of the scene floor (e.g., y=0). This prevents the camera from being translated below the floor and allows for framing arbitrarily small 3D objects or large 3D objects that extend outside the viewport frame. In some embodiments, the minimum camera height can be determined based on a 3D bounding box that bounds the 3D objects within a 3D scene. Preferably, the 3D bounding box is axis-aligned to world space, as illustrated by 3D scene 500 in FIG. 5. In FIG. 5, 3D objects 520 and 525 are arranged in world space relative to world space origin 510 and world space axes 515. 3D bounding box 530 encompasses 3D objects 520 and 525, and its segments are aligned with world space axes 515. In some embodiments, 3D camera rotational component 182 determines a minimum camera height as the center point of the 3D bounding box (e.g., center point 535 of 3D bounding box 530). In some embodiments, 3D camera rotational component 182 sets an arbitrary floor for the 3D camera. For example, some camera rotations and scene geometry adjustments can result in an undesirable camera location for a particular (e.g., on the scene floor). As such, a minimum camera height can be determined, for example, as the larger of the center point of the 3D bounding box and a defined floor.

3D camera rotational component 182 can apply or otherwise preview a 3D camera transformation using the target field of view, target orientation matrix and/or minimum camera height for the 3D camera. If the transformation does not significantly change the horizon (e.g., in viewport space), the transformation is preferably undone (or never applied). Generally, an automatic 3D camera alignment should make a composer's life easier. If, for example, a composer performs an automatic 3D camera alignment, alters the 3D camera orientation (e.g., changes the yaw) and re-runs the automatic 3D camera alignment, it may be desirable to avoid yawing or translating the 3D camera and undoing the composer's changes. Thus, in some embodiments, if a 3D camera transformation (or prospective 3D camera transformation) results in a horizon that does not change by more than a defined threshold (e.g., 1% of the viewport height, 5%, etc.), the 3D camera transformation can be undone (or never applied), and alignment tool 170 exits the alignment process. Otherwise, 3D camera rotational component 182 maintains (or applies) the 3D camera transformation.

With respect to scene geometry, 3D objects in the scene can be rearranged to reduce changes to the framing of a pre-camera-transformation scene composition. In the embodiment depicted in FIG. 1, pivot point identifier 184 generates a pivot point based on the locations of 3D objects in the scene and a pre-transformation orientation of the 3D camera. For example, a pivot plane can be generated to intersect the center of the 3D bounding box normal to a pre-transformation forward vector of the 3D camera, and a pivot point can be generated as the intersection point between the pivot plane and the pre-transformation forward vector of the 3D camera. Other selections for a pivot point within the 3D scene can be implemented and are contemplated within the present disclosure. Preferably, the original distance between the 3D camera before transformation and the pivot point is stored (e.g., in 3D scene elements database 140) for later reference (e.g., by 3D camera translational component 188). Finally, 3D object pivoter 186 can pivot 3D objects in the scene around the pivot point (e.g., pivoting 3D object matrices 142 by delta yaw). This pivoting has the effect of changing positions and orientations of the 3D objects in the world space, but not relative to each other.

Figure 6:
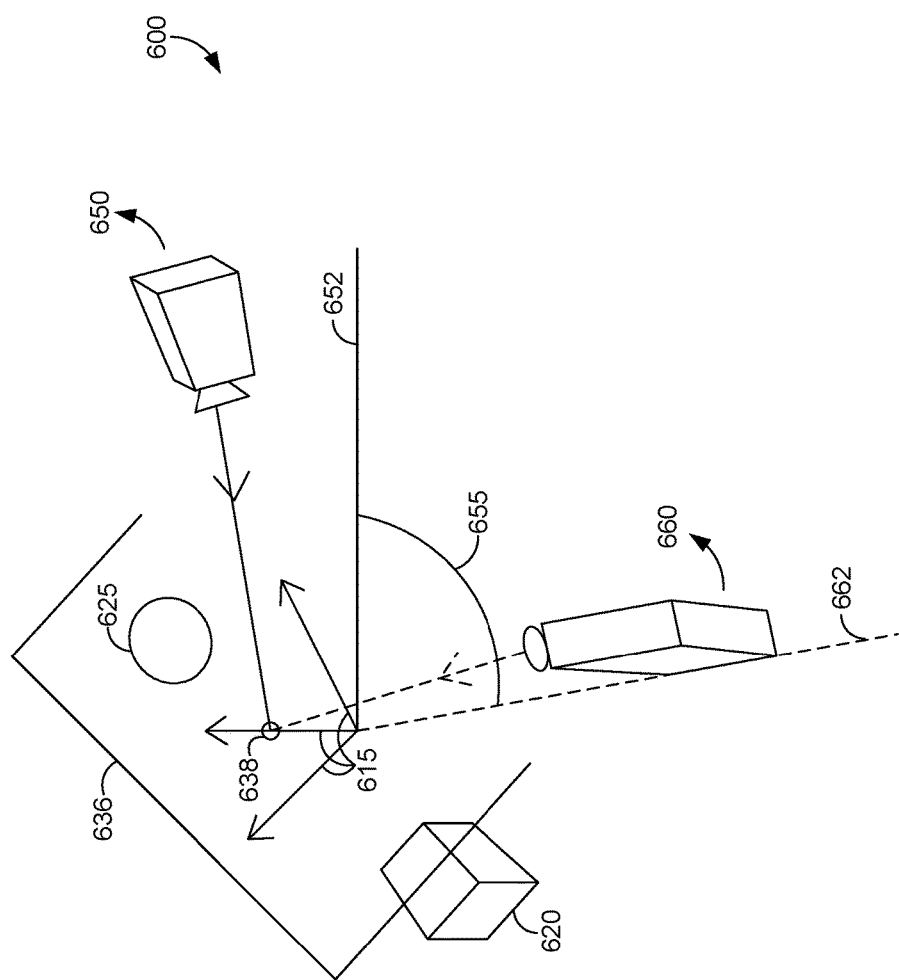
FIG. 6 illustrates an exemplary 3D camera transformation, in accordance with embodiments of the present invention.

For example, FIG. 6 illustrates an exemplary 3D camera transformation (e.g., a rotation and height adjustment). In FIG. 6, 3D scene 600 includes 3D objects 620 and 625 arranged in world space relative to world space axes 615. In FIG. 6, a 3D camera transformation is represented by original 3D camera orientation 650 (and original yaw 652) and transformed 3D camera orientation 660 (and transformed yaw 662). The difference in yaw between original 3D camera orientation 650 and transformed 3D camera orientation 660 is delta yaw 655. Pivot plane 636 is generated to intersect the center of the 3D bounding box that bounds 3D objects 620 and 625 normal to the forward vector of original 3D camera orientation 650. Pivot point 638 is generated as the intersection between pivot plane 636 and the forward vector of original 3D camera orientation 650. In this embodiment, since the 3D camera was yawed by delta yaw 655, 3D objects 620 and 625 can be pivoted around pivot point 638 by delta yaw 655.

Figure 7:
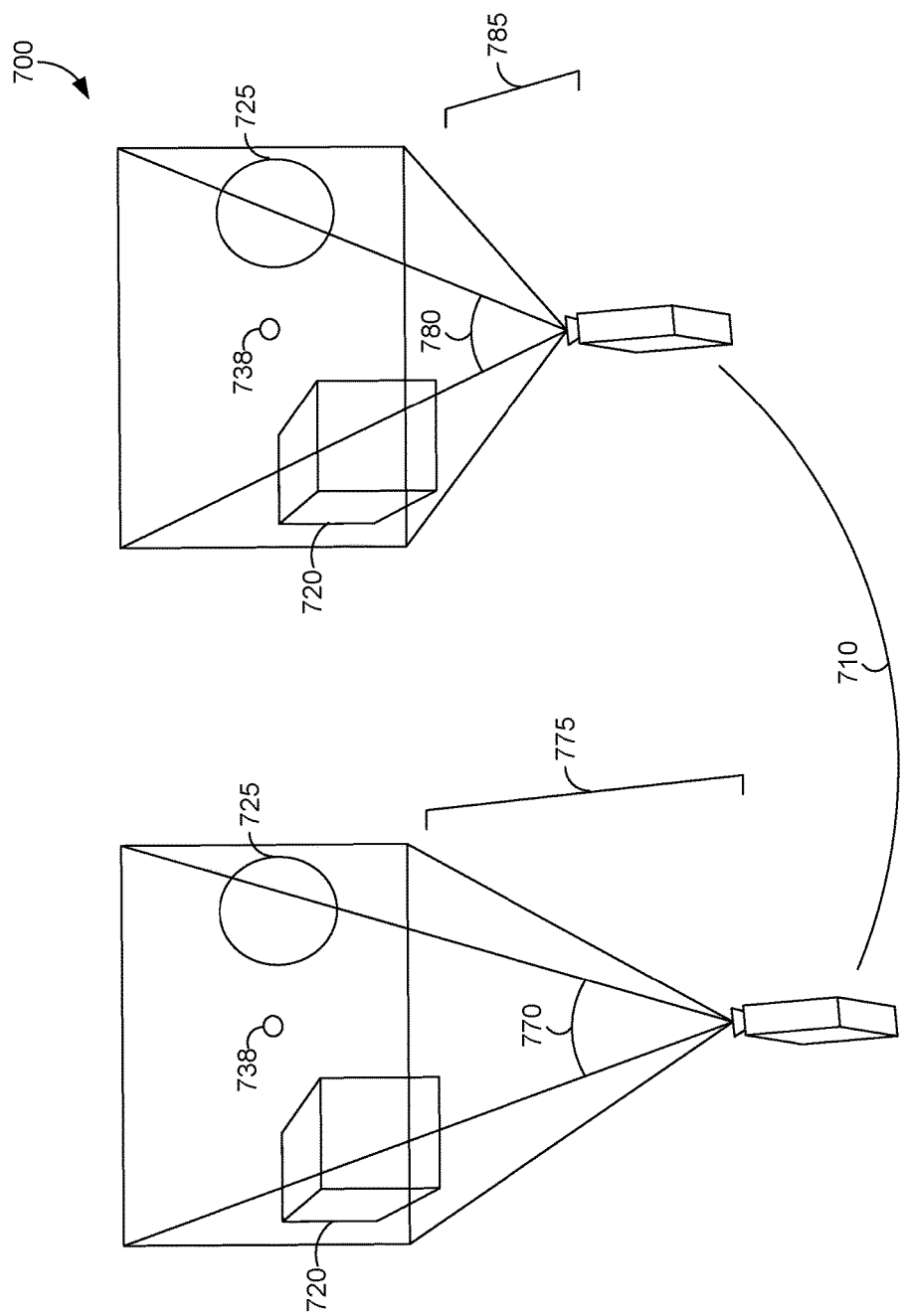
FIG. 7 illustrates an exemplary 3D camera translation, in accordance with embodiments of the present invention.

Returning to FIG. 1, 3D camera translational component 188 can dolly the 3D camera towards or away from the pivot point to match a dimension (e.g., horizontal width, height, diagonal, etc.) of the viewport bounding box before and after a change to the 3D camera field of view. For example, FIG. 7 illustrates exemplary 3D camera translation 700. FIG. 7 depicts 3D camera 710 before (left side of FIG. 7) and after (right side of FIG. 7) a change to a 3D camera field of view from field of view 770 to field of view 780. The viewport bounding box bounds 3D objects 720 and 725. In some embodiments, camera translational component 188 can match the horizontal width of the viewport bounding box before and after the field of view change. For example, camera translational component 188 can determine target distance 785 between 3D camera 710 and pivot point 738 based on (i) original distance 775 between 3D camera 710

(before transformation) and pivot point 738 and (ii) the change in field of view from field of view 770 to field of view 780. In this manner, newDistToPivotPoint can be determined as:

newDistToPivotPoint=tan(originalFOV/2)/tan(newFOV/2)*originalDistToPivot

Thus, 3D camera translational component 188 can determine a 3D camera translation to dolly the 3D camera to newDistToPivotPoint. For example, a newCameraPosition can be determined as:

newCameraPosition=pivotPoint+Forward*newDistToPivotPoint

In some embodiments, the height of the 3D camera can be clamped to a maximum value corresponding to the minimum camera height discussed above. As such, the 3D camera translation has the effect of framing the contents of the scene in approximately the same place in the viewport before and after a field of view change.

Figure 8:
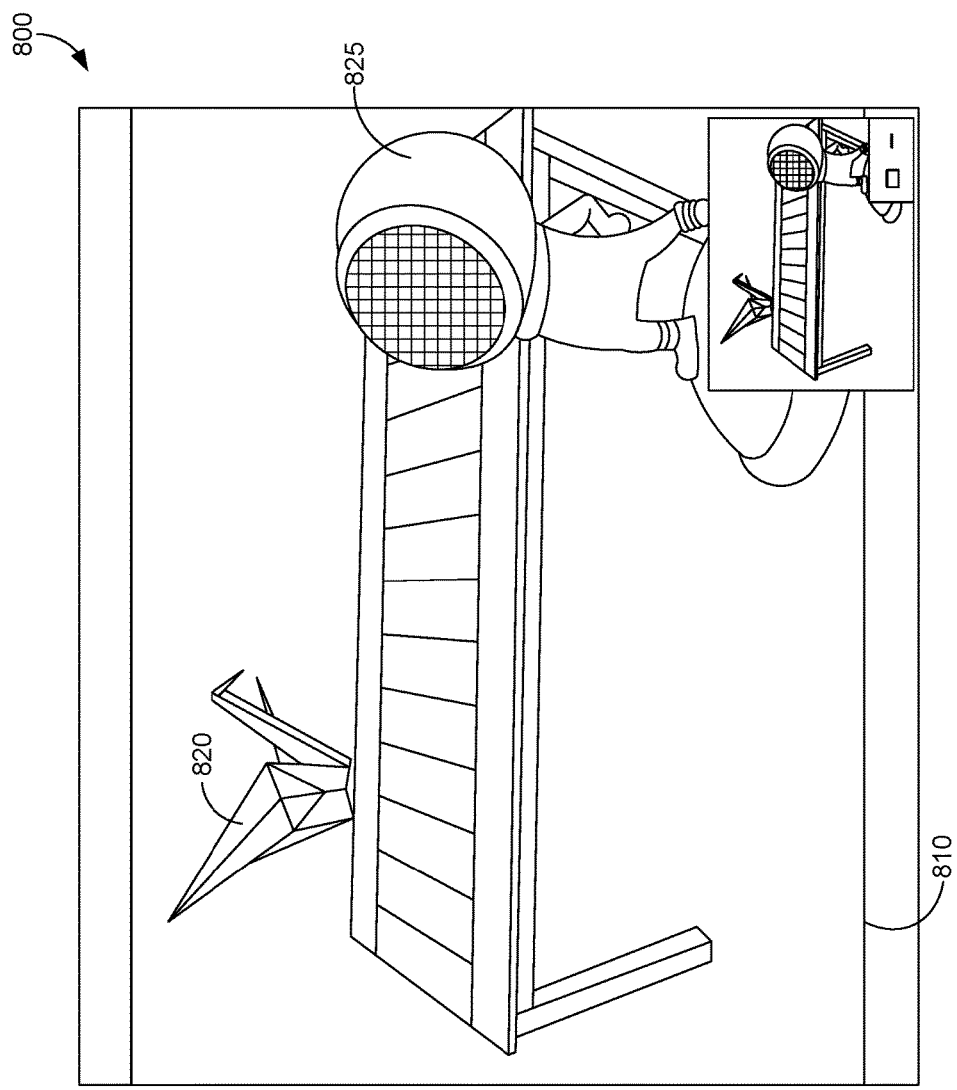
FIGS. 8 and 9 illustrate an exemplary 3D scene composition before and after an automatic 3D camera alignment and scene geometry adjustment, in accordance with embodiments of the present invention.
Figure 9:
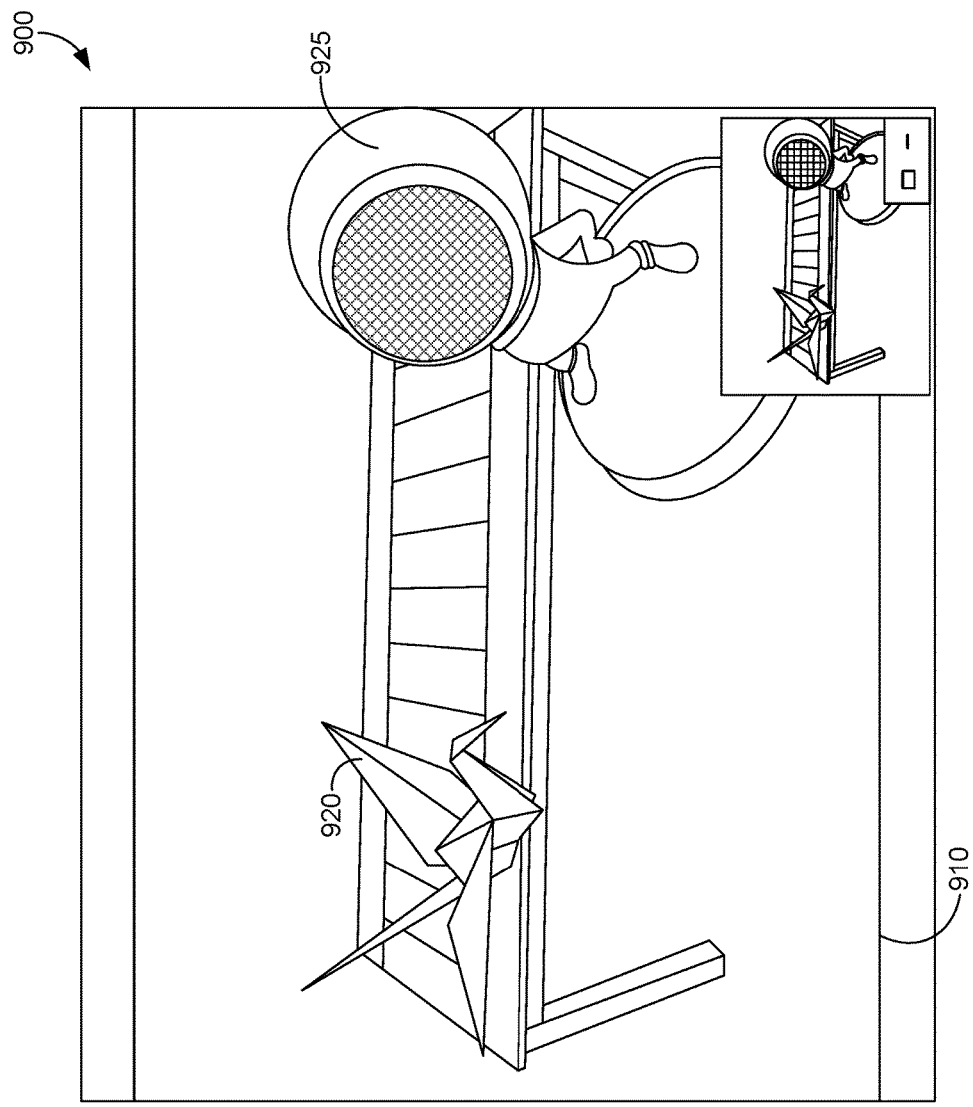

FIGS. 8 and 9 illustrate an exemplary 3D scene composition before (FIG. 8) and after (FIG. 9) an automatic 3D camera alignment and scene geometry adjustment. In FIG. 8, user interface 800 includes 2D background image 810 and 3D objects 820 and 825. In FIG. 9, user interface 900 includes the same 2D background image 910, but the 3D camera viewing the scene has been automatically aligned with 2D background image 910, and 3D objects 920 and 925 have been pivoted to reduce changes to the original framing of the composition. As illustrated, unlike 3D objects 820 and 825 in FIG. 8, 3D objects 920 and 925 in FIG. 9 are aligned with the table in background image 910.

Exemplary Flow Diagrams

With reference now to FIGS. 10-13, flow diagrams are provided illustrating methods for automatically aligning a 3D camera with a 2D background image. Each block of the methods 1000, 1100, 1200, 1300 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Figure 10:
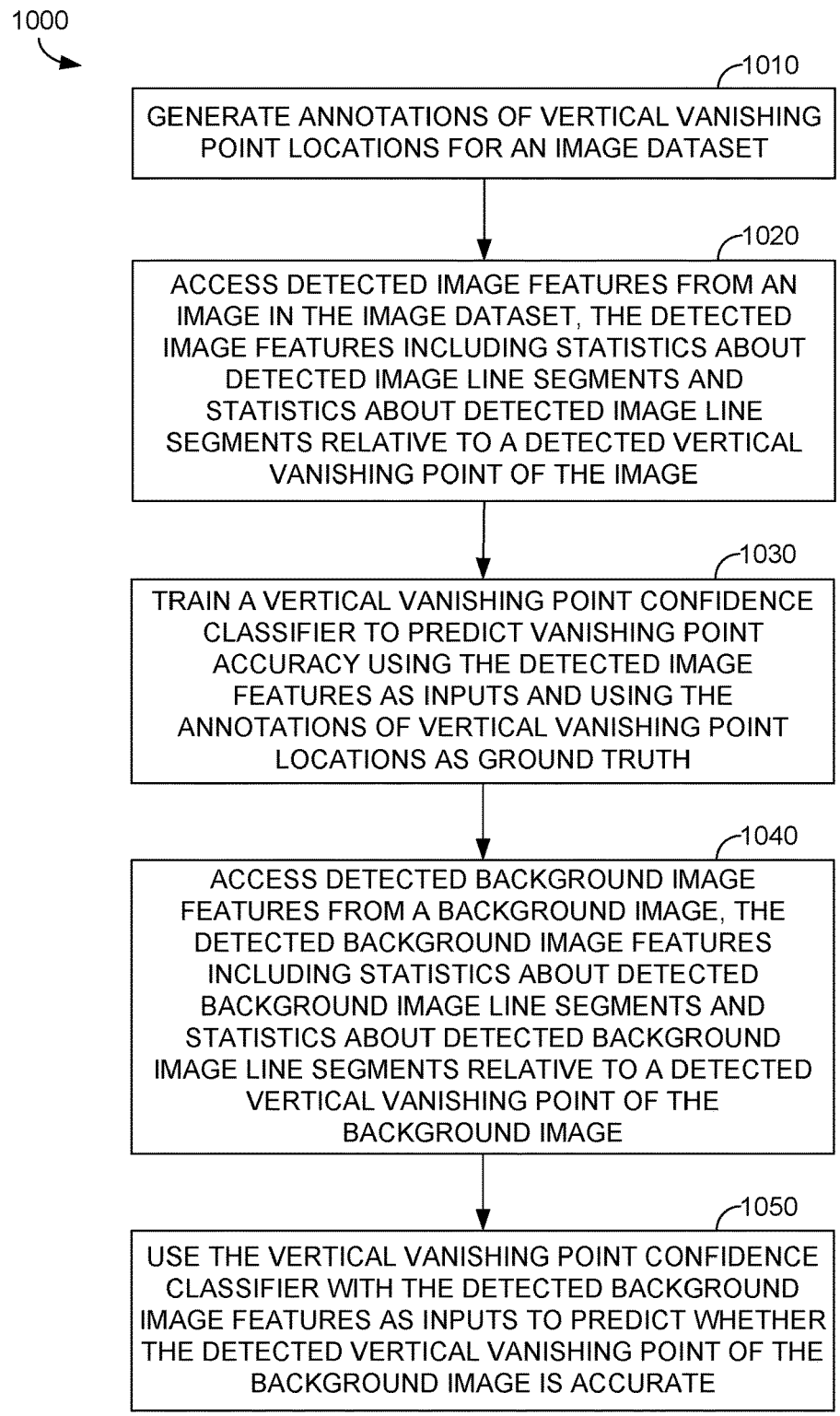
FIG. 10 is a flow diagram showing a method for predicting whether a detected vertical vanishing point is accurate, according to various embodiments of the present invention.

Turning initially to FIG. 10, FIG. 10 illustrates a method 1000 for predicting whether a detected vertical vanishing point is accurate, in accordance with embodiments described herein. At block 1010, annotations of vertical vanishing point locations for an image dataset are generated, for example, by hand. At block 1020, detected image features from an image in the image dataset are accessed, the detected image features including statistics about detected image line segments and statistics about detected image line segments relative to a detected vertical vanishing point of the image. With these detected image features, a vertical vanishing point confidence classifier is trained to predict vanishing point accuracy at block 1030, using the detected image features as inputs and using the annotations of vertical vanishing point locations as ground truth. For example, the classifier can define success (e.g., accuracy within a defined confidence level) using a threshold distance from ground truth, an angular threshold based on vectors generated using ground truth, or some combination thereof. At block 1040, detected background image features from a background image are accessed, the detected background image features including statistics about detected background image line segments and statistics about detected background image line segments relative to a detected vertical vanishing point of the background image. At block 1050, the vertical vanishing point confidence classifier is used, with the detected background image features as inputs, to predict whether the detected vertical vanishing point of the background image is accurate.

Figure 11:
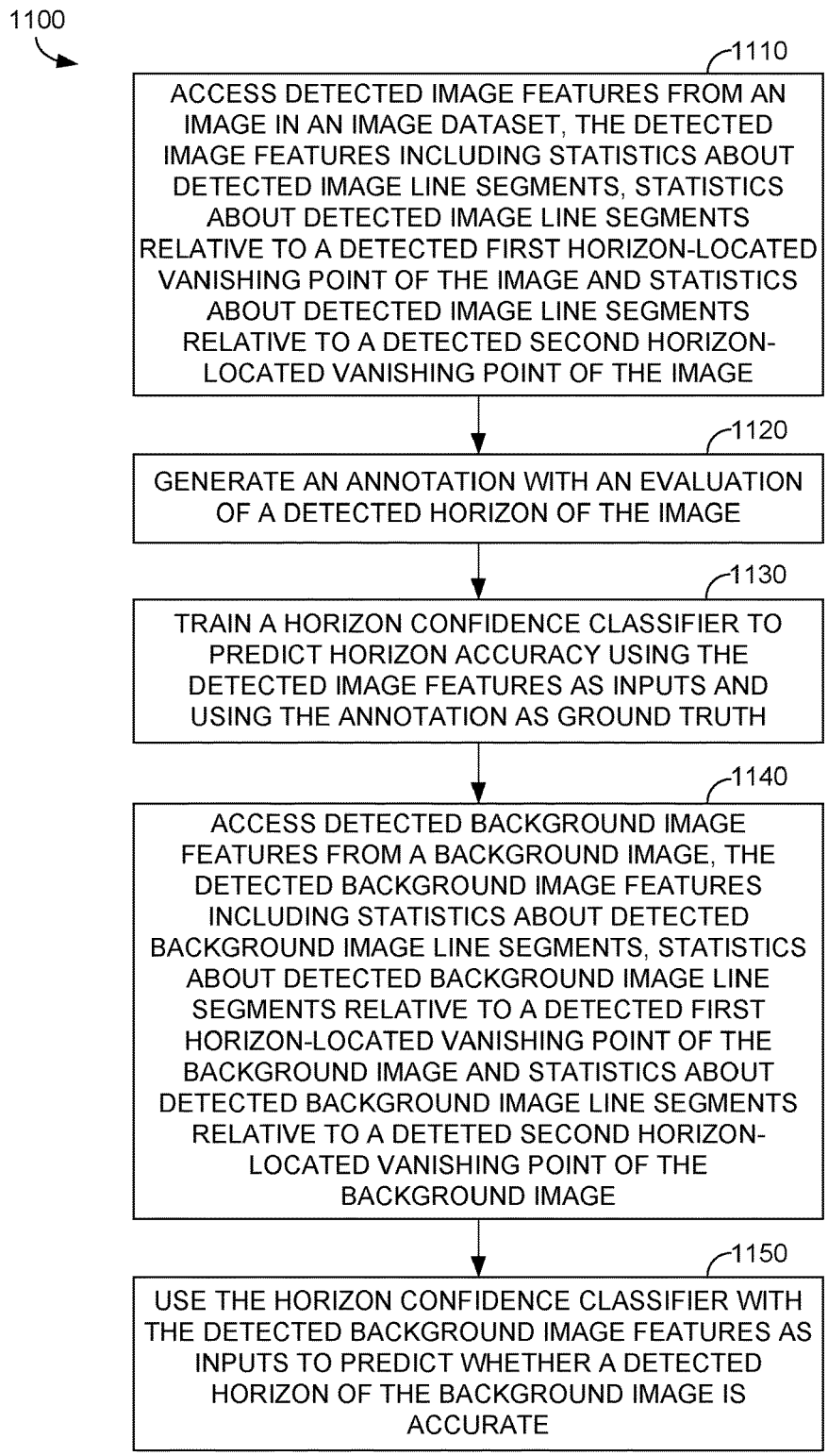
FIG. 11 is a flow diagram showing a method for predicting whether a detected horizon is accurate, according to various embodiments of the present invention.

Turning now to FIG. 11, FIG. 11 illustrates a method 1100 for predicting whether a detected horizon is accurate, in accordance with embodiments described herein. At block 1110, detected image features from an image in an image dataset are accessed, the detected image features including statistics about detected image line segments, statistics about detected image line segments relative to a detected first horizon-located vanishing point of the image and statistics about detected image line segments relative to a detected second horizon-located vanishing point of the image. At block 1120, an annotation with an evaluation of a detected horizon of the image is generated, and a horizon confidence classifier is trained to predict horizon accuracy at block 1130 using the detected image features as inputs and using the annotation as ground truth. For example, the classifier can define success (e.g., accuracy within a defined confidence level) using the annotation with the horizon evaluation in combination with an annotation of a vanishing point location. At block 1140, detected background image features from a background image are accessed. The detected background image features can include statistics about detected background image line segments, statistics about detected background image line segments relative to a detected first horizon-located vanishing point of the background image and statistics about detected background image line segments relative to a detected second horizon-located vanishing point of the background image. At block 1150, the horizon confidence classifier is used, with the detected background image features as inputs, to predict whether a detected horizon of the background image is accurate.

Figure 12:
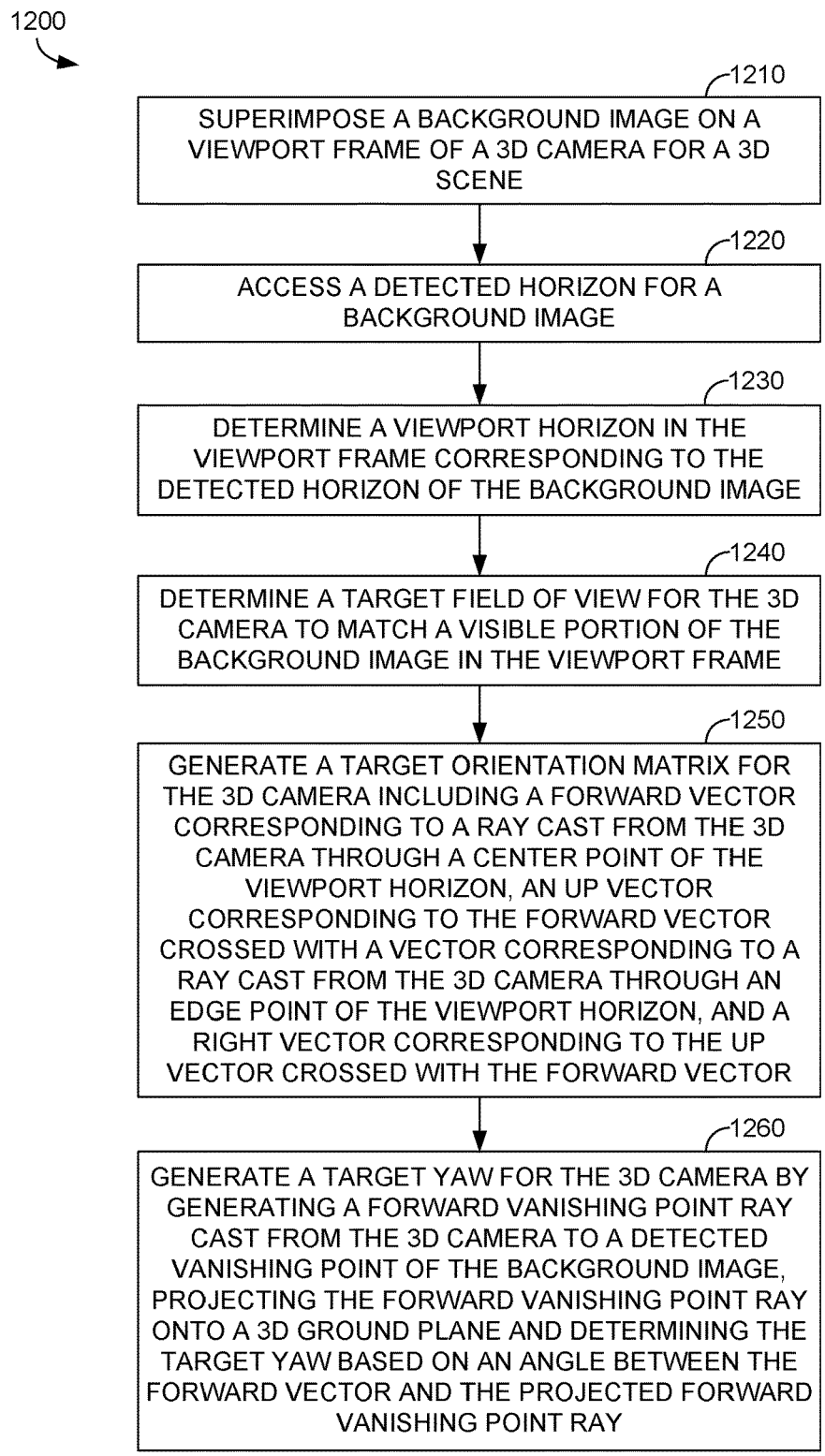
FIG. 12 is a flow diagram showing a method for generating target parameters for a 3D camera transformation, according to various embodiments of the present invention.

Turning now to FIG. 12, FIG. 12 illustrates a method 1200 for generating target parameters for a 3D camera transformation, in accordance with embodiments described herein. At block 1210, a background image is superimposed on a viewport frame of a 3D camera for a 3D scene. At block 1220, a detected horizon for a background image is accessed, and a viewport horizon in the viewport frame is determined corresponding to the detected horizon of the background image at block 1230. At block 1240, a target field of view for the 3D camera is determined to match a visible portion of the background image in the viewport frame. At block 1250, a target orientation matrix for the 3D camera is generated including a forward vector corresponding to a ray cast from the 3D camera through a center point of the viewport horizon, an up vector corresponding to the forward vector crossed with a vector corresponding to a ray cast from the 3D camera through an edge point of the viewport horizon, and a right vector corresponding to the up vector crossed with the forward vector. At block 1260, a target yaw for the 3D camera is generated by casting a forward vanishing point ray from the 3D camera to a detected vanishing point of the background image, projecting the forward vanishing point ray onto a 3D ground plane and determining the target yaw based on an angle between the forward vector and the projected forward vanishing point ray.

Figure 13:
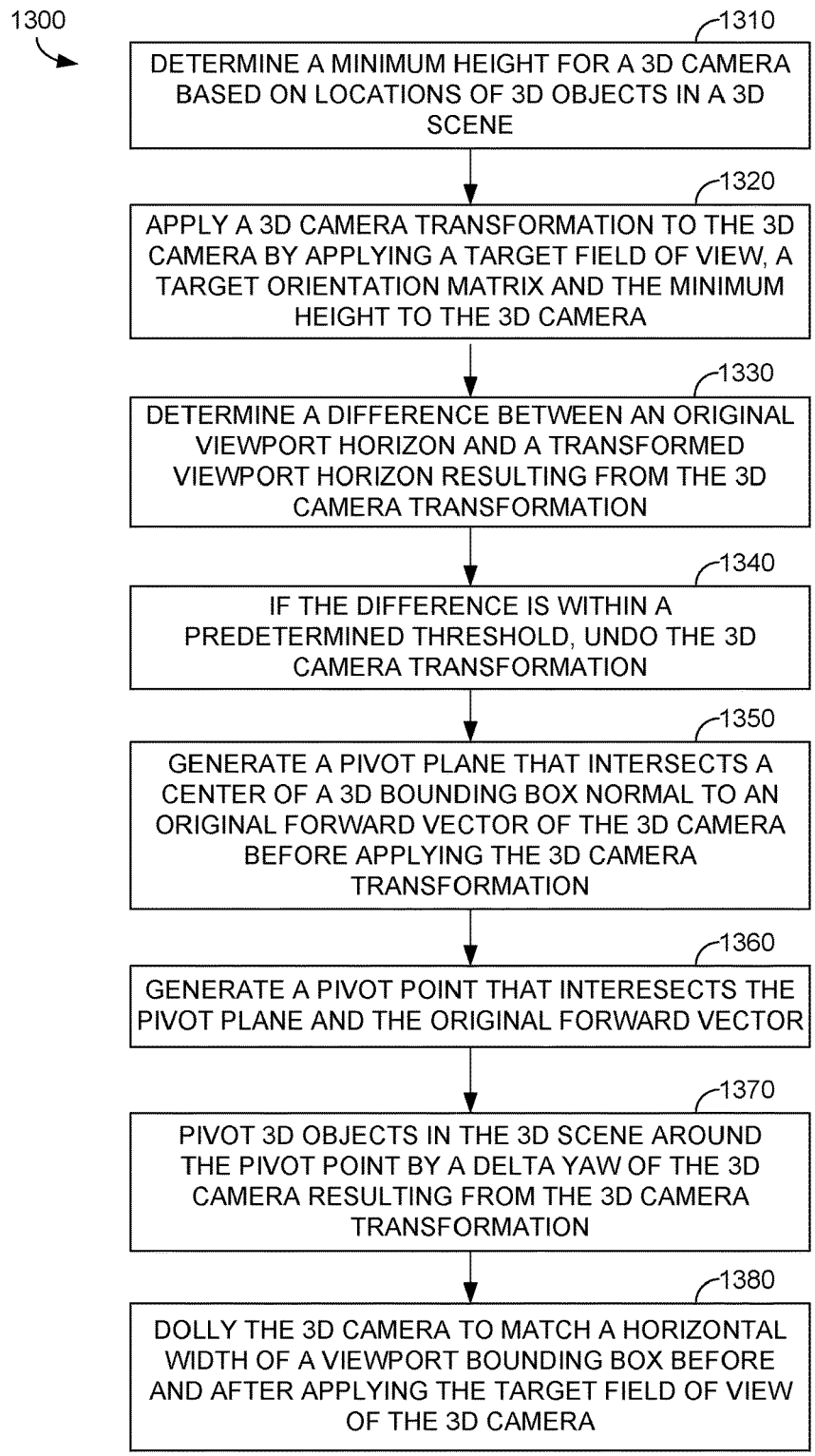
FIG. 13 is a flow diagram showing a method for performing a 3D scene transformation, according to various embodiments of the present invention.

Turning now to FIG. 13, FIG. 13 illustrates a method 1300 for performing a 3D scene transformation, in accordance with embodiments described herein. At block 1310, a minimum height for a 3D camera is determined based on locations of 3D objects in a 3D scene. At block 1320, a 3D camera transformation is applied to the 3D camera by applying a target field of view, a target orientation matrix and the minimum height to the 3D camera. At block 1330, a difference is determined between an original viewport horizon and a transformed viewport horizon resulting from the 3D camera transformation. If the difference is within a predetermined threshold, 3D camera transformation is undone at block 1340. At block 1350, a pivot plane is generated that intersects a center of a 3D bounding box normal to an original forward vector of the 3D camera before applying the 3D camera transformation. At block 1360, a pivot point is generated that intersects the pivot plane and the original forward vector. At block 1370, 3D objects in the 3D scene are pivoted around the pivot point by a delta yaw of the 3D camera resulting from the 3D camera transformation. At block 1380, the 3D camera is dollied to match a horizontal width of a viewport bounding box before and after applying the target field of view of the 3D camera.

Exemplary Computing Environment

Figure 14:
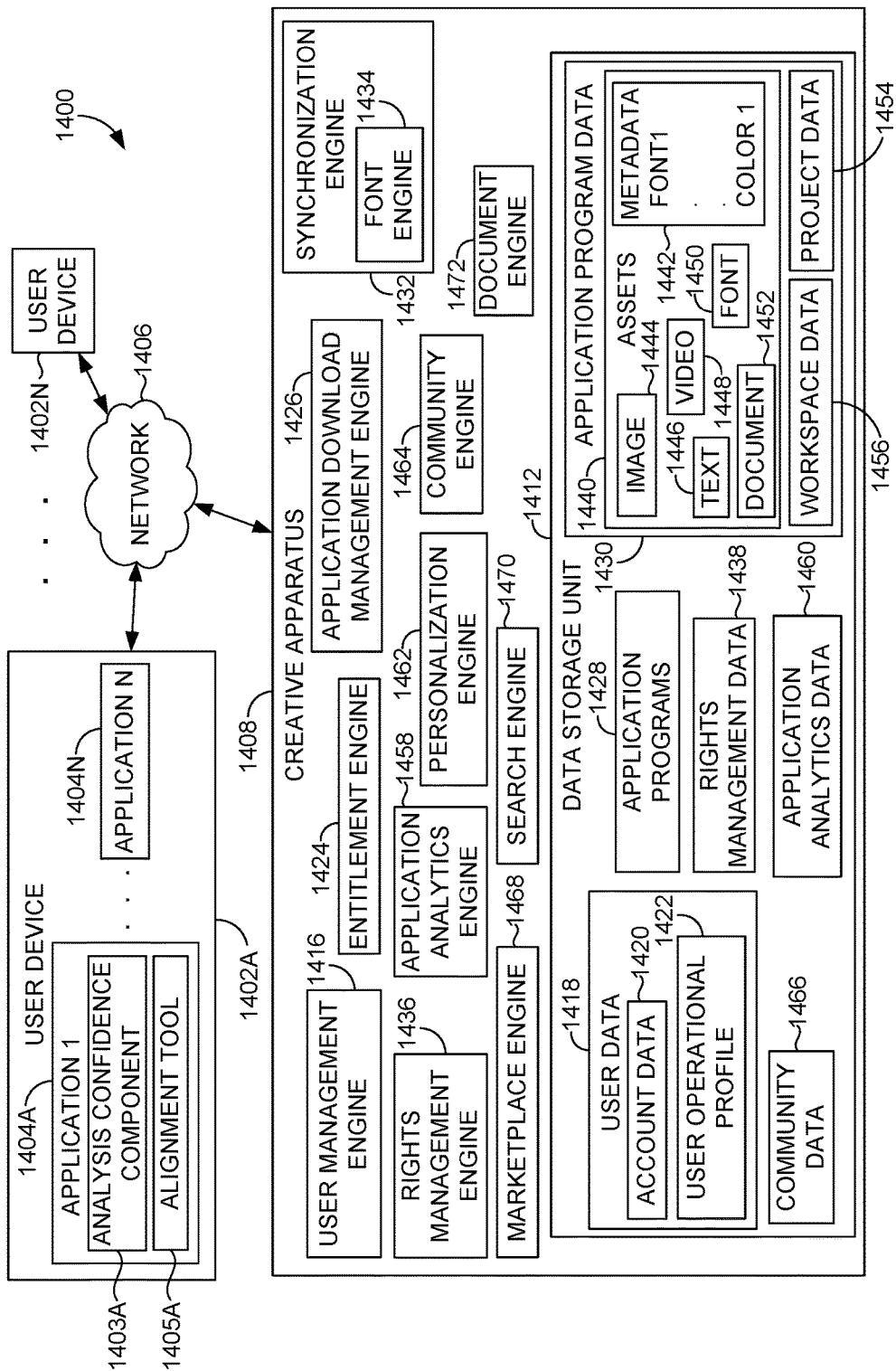
FIG. 14 is a block diagram of an exemplary computing environment in which embodiments of the invention may be employed.

FIG. 14 is a diagram of an environment 1400 in which one or more embodiments of the present disclosure can be practiced. The environment 1400 includes one or more user devices, such as user devices 1402A-1402N. Examples of the user devices include, but are not limited to, a personal computer (PC), tablet computer, a desktop computer, cellular telephone, a processing unit, any combination of these devices, or any other suitable device having one or more processors. Each user device includes at least one application supported by the creative apparatus 1408. It is to be appreciated that following description may generally refer to the user device 1402A as an example and any other user device can be used.

A user of the user device can utilize various products, applications, or services supported by the creative apparatus 1408 via the network 1406. The user devices 1402A-1402N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manage digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes the creative apparatus 1408.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 1402A-1402N can be connected to a creative apparatus 1408 via a network 1406. Examples of the network 1406 include, but are not limited to, internet, local area network (LAN), wireless area network, wired area network, wide area network, and the like.

The creative apparatus 1408 includes one or more engines for providing one or more digital experiences to the user. The creative apparatus 1408 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 1408 also includes a data storage unit 1412. The data storage unit 1412 can be implemented as one or more databases or one or more data servers. The data storage unit 1412 includes data that is used by the engines of the creative apparatus 1408.

A user of the user device 1402A visits a webpage or an application store to explore applications supported by the creative apparatus 1408. The creative apparatus 1408 provides the applications as a software as a service (SaaS), or as a standalone application that can be installed on the user device 1402A, or as a combination. The user can create an account with the creative apparatus 1408 by providing user details and also by creating login details. Alternatively, the creative apparatus 1408 can automatically create login details for the user in response to receipt of the user details. In some embodiments, the user is also prompted to install an application manager. The application manager enables the user to manage installation of various applications supported by the creative apparatus 1408 and also to manage other functionalities, such as updates, subscription account and the like, associated with the applications. The user details are received by a user management engine 1416 and stored as user data 1418 in the data storage unit 1412. In some embodiments, the user data 1418 further includes account data 1420 under which the user details are stored.

The user can either opt for a trial account or can make payment based on type of account or subscription chosen by the user. Alternatively, the payment can be based on product or number of products chosen by the user. Based on payment details of the user, a user operational profile 1422 is generated by an entitlement engine 1424. The user operational profile 1422 is stored in the data storage unit 1412 and indicates entitlement of the user to various products or services. The user operational profile 1422 also indicates type of user, i.e. free, trial, student, discounted, or paid.

In some embodiment, the user management engine 1416 and the entitlement engine 1424 can be one single engine performing the functionalities of both the engines.

The user can then install various applications supported by the creative apparatus 1408 via an application download management engine 1426. Application installers or application programs 1428 present in the data storage unit 1412 are fetched by the application download management engine 1426 and made available to the user directly or via the application manager. In one embodiment, an indication of all application programs 1428 are fetched and provided to the user via an interface of the application manager. In another embodiment, an indication of application programs 1428 for which the user is eligible based on user's operational profile are displayed to the user. The user then selects the application programs 1428 or the applications that the user wants to download. The application programs 1428 are then downloaded on the user device 1402A by the application manager via the application download management engine 1426. Corresponding data regarding the download is also updated in the user operational profile 1422. An application program 1428 is an example of the digital tool. The application download management engine 1426 also manages the process of providing updates to the user device 1402A.

Upon download, installation and launching of an application program, in one embodiment, the user is asked to provide the login details. A check is again made by the user management engine 1416 and the entitlement engine 1424 to ensure that the user is entitled to use the application program. In another embodiment, direct access is provided to the application program as the user is already logged into the application manager.

The user uses one or more application programs 1404A-1404N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 1430 in the data storage unit 1412 by a synchronization engine 1432. Alternatively or additionally, such data can be stored at the user device, such as user device 1402A.

The application program data 1430 includes one or more assets 1440. The assets 1440 can be a shared asset which the user wants to share with other users or which the user wants to offer on a marketplace. The assets 1440 can also be shared across multiple application programs 1428. Each asset includes metadata 1442. Examples of the metadata 1442 include, but are not limited to, font, color, size, shape, coordinate, a combination of any of these, and the like. In addition, in one embodiment, each asset also includes a file. Examples of the file include, but are not limited to, an image 1444, text 1446, a video 1448, a font 1450, a document 1452, a combination of any of these, and the like. In another embodiment, an asset only includes the metadata 1442.

The application program data 1430 also include project data 1454 and workspace data 1456. In one embodiment, the project data 1454 includes the assets 1440. In another embodiment, the assets 1440 are standalone assets. Similarly, the workspace data 1456 can be part of the project data 1454 in one embodiment while it may be standalone data in other embodiment.

A user can operate one or more user device to access data. In this regard, the application program data 1430 is accessible by a user from any device, including a device which was not used to create the assets 1440. This is achieved by the synchronization engine 1432 that stores the application program data 1430 in the data storage unit 1412 and enables the application program data 1430 to be available for access by the user or other users via any device. Before accessing the application program data 1430 by the user from any other device or by any other user, the user or the other user may need to provide login details for authentication if not already logged in. In some cases, if the user or the other user are logged in, then a newly created asset or updates to the application program data 1430 are provided in real time. The rights management engine 1436 is also called to determine whether the newly created asset or the updates can be provided to the other user or not. The workspace data 1456 enables the synchronization engine 1432 to provide a same workspace configuration to the user on any other device or to the other user based on rights management data 1438.

In various embodiments, various types of synchronization can be achieved. For example, the user can pick a font or a color from the user device 1402A using a first application program and can use the font or the color in a second application program on any other device. If the user shares the font or the color with other users, then the other users can also use the font or the color. Such synchronization generally happens in real time. Similarly, synchronization of any type of the application program data 1430 can be performed.

In some embodiments, user interaction with the applications 1404 is tracked by an application analytics engine 1458 and stored as application analytics data 1460. The application analytics data 1460 includes, for example, usage of a tool, usage of a feature, usage of a workflow, usage of the assets 1440, and the like. The application analytics data 1460 can include the usage data on a per user basis and can also include the usage data on a per tool basis or per feature basis or per workflow basis or any other basis. The application analytics engine 1458 embeds a piece of code in the applications 1404 that enables the application to collect the usage data and send it to the application analytics engine 1458. The application analytics engine 1458 stores the usage data as the application analytics data 1460 and processes the application analytics data 1460 to draw meaningful output. For example, the application analytics engine 1458 can draw an output that the user uses "Tool 4" a maximum number of times. The output of the application analytics engine 1458 is used by a personalization engine 1462 to personalize a tool menu for the user to show "Tool 4" on top. Other types of personalization can also be performed based on application analytics data 1460. In addition, the personalization engine 1462 can also use the workspace data 1456 or the user data 1418 including user preferences to personalize one or more application programs 1428 for the user.

In some embodiments, the application analytics data 1460 includes data indicating status of a project of the user. For example, if the user was preparing an article in a digital publishing application and what was left was publishing the prepared article at the time the user quit the digital publishing application, then the application analytics engine 1458 tracks the state. Now when the user next opens the digital publishing application on another device, then the user is indicated and the state and options are provided to the user for publishing using the digital publishing application or any other application. In addition, while preparing the article, a recommendation can also be made by the synchronization engine 1432 to incorporate some of other assets saved by the user and relevant for the article. Such a recommendation can be generated using one or more engines, as described herein.

The creative apparatus 1408 also includes a community engine 1464 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes the application program data 1440. The community engine 1464 stores any data corresponding to the community, such as work shared on the community and comments or likes received for the work as community data 1466. The community data 1466 also includes notification data and is used for notifying other users by the community engine in case of any activity related to the work or new work being shared. The community engine 1464 works in conjunction with the synchronization engine 1432 to provide collaborative workflows to the user. For example, the user can create an image and can request for some expert opinion or expert editing. An expert user can then either edit the image as per the user liking or can provide expert opinion. The editing and providing of the expert opinion by the expert is enabled using the community engine 1464 and the synchronization engine 1432. In collaborative workflows, a plurality of users is assigned different tasks related to the work.

The creative apparatus 1408 also includes a marketplace engine 1468 for providing marketplace to one or more users. The marketplace engine 1468 enables the user to offer an asset for selling or using. The marketplace engine 1468 has access to the assets 1440 that the user wants to offer on the marketplace. The creative apparatus 1408 also includes a search engine 1470 to enable searching of the assets 1440 in the marketplace. The search engine 1470 is also a part of one or more application programs 1428 to enable the user to perform search for the assets 1440 or any other type of the application program data 1430. The search engine 1470 can perform a search for an asset using the metadata 1442 or the file.

The creative apparatus 1408 also includes a document engine 1472 for providing various document related workflows, including electronic or digital signature workflows, to the user. The document engine 1472 can store documents as the assets 1440 in the data storage unit 1412 or can maintain a separate document repository (not shown in FIG. 14).

In accordance with embodiments of the present invention, application programs 1428 include a 3D composition application that facilitates 3D composition and/or graphic design. In these embodiments, the 3D composition application is provided to the user device 1402A (e.g., as application 1404N) such that the 3D composition application operates via the user device. In some embodiments, an analysis confidence component (e.g., analysis confidence component 1403A) and/or and alignment tool (e.g., alignment tool 1405A) are provided as add-ons or plug-ins to an application such as a 3D composition application, as further described above with reference to FIG. 1. These configurations are merely exemplary, and other variations for providing analysis confidence and/or automatic 3D camera alignment software functionality are contemplated within the present disclosure.

It is to be appreciated that the engines and working of the engines are described as examples herein, and the engines can be used for performing any step in providing digital experience to the user.

Exemplary Operating Environment

Figure 15:
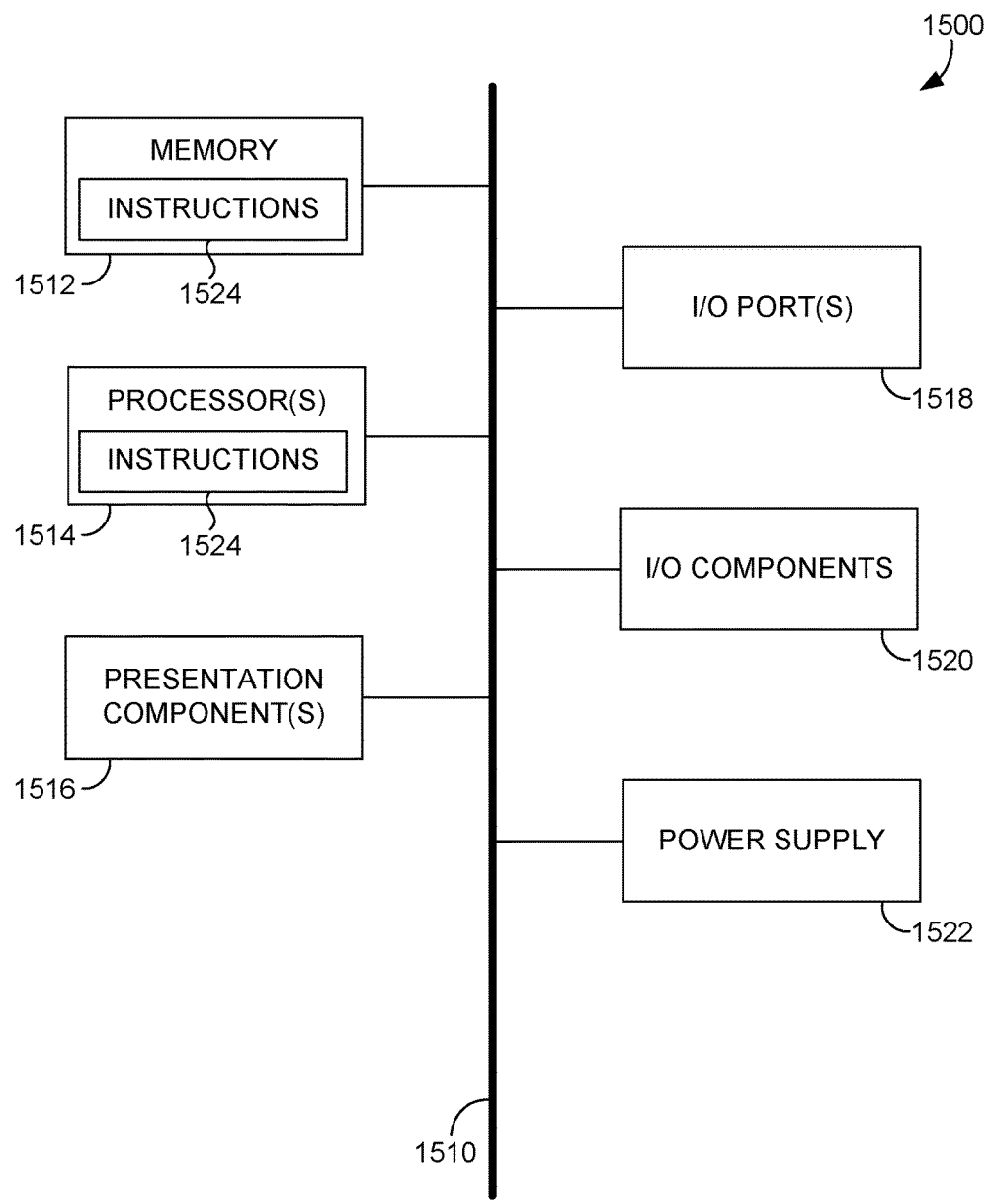
FIG. 15 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 15 in particular, an exemplary operating environment for implementing embodiments of the present invention is shown and designated generally as computing device 1500. Computing device 1500 is but one example of a suitable computing environment and is not intended to suggest any limitation as to the scope of use or functionality of the invention. Neither should the computing device 1500 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 15, computing device 1500 includes a bus 1510 that directly or indirectly couples the following devices: memory 1512, one or more processors 1514, one or more presentation components 1516, input/output (I/O) ports 1518, input/output components 1520, and an illustrative power supply 1522. Bus 1510 represents what may be one or more busses (such as an address bus, data bus, or combination thereof). Although the various blocks of FIG. 15 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 15 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 15 and reference to "computing device."

Computing device 1500 typically includes a variety of computer-readable media. Computer-readable media can be any available media that can be accessed by computing device 1500 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1512 includes computer-storage media in the form of volatile and/or nonvolatile memory. The memory may be removable, non-removable, or a combination thereof. Exemplary hardware devices include solid-state memory, hard drives, optical-disc drives, etc. Computing device 1500 includes one or more processors that read data from various entities such as memory 1512 or I/O components 1520. Presentation component(s) 1516 present data indications to a user or other device. Exemplary presentation components include a display device, speaker, printing component, vibrating component, etc.

I/O ports 1518 allow computing device 1500 to be logically coupled to other devices including I/O components 1520, some of which may be built in. Illustrative components include a microphone, joystick, game pad, satellite dish, scanner, printer, wireless device, etc. The I/O components 1520 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1500. The computing device 1500 may be equipped with depth cameras, such as stereoscopic camera systems, infrared camera systems, RGB camera systems, touchscreen technology, and combinations of these, for gesture detection and recognition. Additionally, the computing device 1500 may be equipped with accelerometers or gyroscopes that enable detection of motion. The output of the accelerometers or gyroscopes may be provided to the display of the computing device 1500 to render immersive augmented reality or virtual reality.

Embodiments described herein support automatic alignment of a 3D camera with a background image and/or accuracy predictions for an image analysis. The components described herein refer to integrated components of an automatic alignment and/or accuracy prediction system. The integrated components refer to the hardware architecture and software framework that support functionality using the system. The hardware architecture refers to physical components and interrelationships thereof and the software framework refers to software providing functionality that can be implemented with hardware embodied on a device.

The end-to-end software-based automatic alignment and/or accuracy prediction system can operate within the system components to operate computer hardware to provide automatic alignment and/or accuracy prediction system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for the system functionality. Any other variations and combinations thereof are contemplated with embodiments of the present invention.

Having identified various components of the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized method for automatically aligning a 3D virtual camera ("3D camera") of a 3D scene with a 2D image, the method comprising:
   automatically aligning the 3D camera with the 2D image by applying a 3D transformation to the 3D camera to point the 3D camera at a detected horizon of the 2D image and change a perspective from which to view 3D objects in the 3D scene, wherein the perspective is associated with a 2D viewport frame corresponding to the 3D camera; and
   pivoting one or more 3D objects in the 3D scene around a pivot point at a different location from the one or more 3D objects by a pivoting angle determined by a rotation of the 3D camera corresponding to the 3D transformation.

2. The method of claim 1, wherein the automatically aligning the 3D camera with the 2D image comprises:
superimposing the 2D image on the 2D viewport frame;
generating a viewport horizon in the 2D viewport frame corresponding to the detected horizon;
generating a target orientation matrix for the 3D camera corresponding to a target orientation pointing the 3D camera at the viewport horizon; and
applying the 3D transformation to the 3D camera based on the target orientation matrix.

3. The method of claim 2, wherein the generating the target orientation matrix comprises:
generating an intermediate orientation matrix that would point the 3D camera at the viewport horizon;
generating a target yaw that would point the 3D camera at a detected vanishing point of the 2D image in the 2D viewport frame; and
determining the target orientation matrix based on the intermediate orientation matrix and the target yaw.

4. The method of claim 3, wherein the intermediate orientation matrix comprises:
a forward vector corresponding to a ray cast from the 3D camera through a center point of the viewport horizon;
an up vector corresponding to the forward vector crossed with a vector corresponding to a ray cast from the 3D camera through an edge point of the viewport horizon; and
a right vector corresponding to the up vector crossed with the forward vector.

5. The method of claim 4, wherein the generating the target yaw comprises:
generating a forward vanishing point ray by casting a ray from the 3D camera to the detected vanishing point;
projecting the forward vanishing point ray onto a 3D ground plane; and
determining the target yaw based on the angle between the forward vector and the projected forward vanishing point ray.

6. The method of claim 1, additionally comprising:
using a classifier to predict an accuracy of at least one of the detected horizon or a detected vanishing point for the 2D image, and
wherein the 3D transformation is applied based on the classifier predicting the accuracy.

7. The method of claim 6:
wherein the detected vanishing point is a detected horizon-located vanishing point corresponding to the detected horizon; and
wherein the classifier is configured to predict the accuracy of the detected horizon based on detected image features from the 2D image, the detected image features comprising statistics about detected image line segments relative to the detected horizon-located vanishing point.

8. The method of claim 1, additionally comprising:
generating a target field of view for the 3D camera to match a visible portion of the 2D image in the 2D viewport frame;
applying the target field of view to the 3D camera; and
translating the 3D camera to compensate for the applied target field of view.

9. The method of claim 1,
wherein the 3D transformation is based on a target yaw of the 3D camera;
wherein the method additionally comprises generating a delta yaw that would result from rotating the 3D camera to the target yaw; and
wherein the pivoting angle is the delta yaw.

10. The method of claim 1, additionally comprising:
generating a pivot plane that intersects a center of a 3D scene bounding box normal to an original forward vector of the 3D camera; and
generating the pivot point as a point of intersection between the pivot plane and the original forward vector.

11. One or more computer storage media storing computer-useable instructions that, when used by one or more computing devices, cause the one or more computing devices to perform operations for automatically aligning a virtual 3D camera ("3D camera") of a 3D scene with a 2D image, the operations comprising:
superimposing the 2D image on a 2D viewport frame corresponding to the 3D camera;
generating a viewport horizon in the 2D viewport frame corresponding to a detected horizon of the 2D image;
generating a target orientation matrix for the 3D camera corresponding to a target orientation pointing the 3D camera at the viewport horizon;
applying a 3D transformation to the 3D camera based on the target orientation matrix; and
pivoting one or more 3D objects in the 3D scene around a pivot point by a pivoting angle determined by a rotation of the 3D camera corresponding to the 3D transformation.

12. The media of claim 11,
wherein the operations additionally comprise using a classifier to predict an accuracy of at least one of the detected horizon or a detected vanishing point for the 2D image, and
wherein the 3D transformation is applied based on the classifier predicting the accuracy.

13. The media of claim 12,
wherein the detected vanishing point is a detected horizon-located vanishing point corresponding to the detected horizon; and
wherein the classifier is configured to predict the accuracy of the detected horizon based on detected image features from the 2D image, the detected image features comprising statistics about detected image line segments relative to the detected horizon-located vanishing point.

14. The media of claim 11, wherein the operations additionally comprise:
generating a target field of view for the 3D camera to match a visible portion of the 2D image in the 2D viewport frame;
applying the target field of view to the 3D camera; and
translating the 3D camera to compensate for the applied target field of view.

15. The media of claim 11,
wherein the target orientation matrix is based on a target yaw of the 3D camera;
wherein the operations additionally comprise generating a delta yaw that would result from rotating the 3D camera to the target yaw; and
wherein the pivoting angle is the delta yaw.

16. A computer system comprising:
one or more hardware processors and memory configured to provide computer program instructions to the one or more hardware processors;

means for determining a prediction that an automated image analysis comprising at least one of a detected horizon or a detected vanishing point for a 2D image is likely to be accurate;

an alignment tool configured to utilize the one or more hardware processors to perform operations based on the means for determining a prediction predicting that the automated image analysis is likely to be accurate, the operations comprising:

automatically aligning a virtual 3D camera ("3D camera") with the 2D image by applying a 3D transformation to the 3D camera to point the 3D camera at the detected horizon of the 2D image and change a perspective from which to view 3D objects in a 3D scene, wherein the perspective is associated with a 2D viewport frame corresponding to the 3D camera; and pivoting one or more 3D objects in the 3D scene around a pivot point by a pivoting angle determined by a rotation of the 3D camera corresponding to the 3D transformation.

17. The computer system of claim 16, wherein the alignment tool is configured to automatically align the 3D camera with the 2D image by:

superimposing the 2D image on the 2D viewport frame;

generating a viewport horizon in the 2D viewport frame corresponding to the detected horizon of the 2D image;

generating a target orientation matrix for the 3D camera corresponding to a target orientation pointing the 3D camera at the viewport horizon; and applying the 3D transformation to the 3D camera based on the target orientation matrix.

18. The computer system of claim 16, wherein the alignment tool is additionally configured to:

generate a target field of view for the 3D camera to match a visible portion of the 2D image in the 2D viewport frame;

apply the target field of view to the 3D camera; and translate the 3D camera to compensate for the applied target field of view.

19. The computer system of claim 16, wherein the 3D transformation is based on a target yaw of the 3D camera;

wherein the alignment tool is additionally configured to generate a delta yaw that would result from rotating the 3D camera to the target yaw; and wherein the pivoting angle is the delta yaw.

20. The computer system of claim 16, wherein the alignment tool is additionally configured to:

generate a pivot plane that intersects a center of a 3D scene bounding box normal to an original forward vector of the 3D camera; and generate the pivot point as a point of intersection between the pivot plane and the original forward vector.

* * * * *